United States Patent
Ogino et al.

(10) Patent No.: US 11,397,110 B2
(45) Date of Patent: Jul. 26, 2022

(54) COLOR CALIBRATION VIEWER, AND COLOR CALIBRATION SET IN WHICH SAME IS USED

(71) Applicant: DAI NIPPON PRINTING CO., LTD., Tokyo-to (JP)

(72) Inventors: Yoshihiko Ogino, Tokyo-to (JP); Keiichi Ganbe, Tokyo-to (JP); Kazumasa Onuki, Tokyo-to (JP); Takahiro Sahara, Tokyo-to (JP); Yoichi Kajimura, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/754,608

(22) PCT Filed: Oct. 18, 2018

(86) PCT No.: PCT/JP2018/038780
§ 371 (c)(1),
(2) Date: Apr. 8, 2020

(87) PCT Pub. No.: WO2019/078288
PCT Pub. Date: Apr. 25, 2019

(65) Prior Publication Data
US 2020/0284656 A1    Sep. 10, 2020

(30) Foreign Application Priority Data

Oct. 19, 2017  (JP) .............. JP2017-202612

(51) Int. Cl.
*G01J 3/10* (2006.01)
*G01J 3/52* (2006.01)

(52) U.S. Cl.
CPC .. *G01J 3/10* (2013.01); *G01J 3/52* (2013.01)

(58) Field of Classification Search
CPC ...................... G01J 3/10; G01J 3/52
See application file for complete search history.

(56) References Cited

U.S. PATENT DOCUMENTS

| | | | | |
|---|---|---|---|---|
| 2004/0119086 A1* | 6/2004 | Yano | ............... | H01L 33/50 257/98 |
| 2015/0263240 A1* | 9/2015 | Tomizawa | ............ | H05B 45/20 362/84 |

(Continued)

FOREIGN PATENT DOCUMENTS

| | | |
|---|---|---|
| JP | S59-073872 U | 5/1984 |
| JP | S59-134964 U | 9/1984 |

(Continued)

OTHER PUBLICATIONS

Jan. 22, 2019 Search Report issued in International Patent Application No. PCT/JP2018/038780.

(Continued)

*Primary Examiner* — Jamil Ahmed
(74) *Attorney, Agent, or Firm* — Oliff PLC

(57) ABSTRACT

A color calibration viewer used in color calibration, wherein: the relative intensity at a wavelength of 505 nm is 0.80 or more and 0.95 or less, and the relative intensity at a wavelength of 620 nm is 0.65 or more and 0.80 or less, where 1 designates the optical intensity of a peak top in a first wavelength region at a wavelength of 440 nm or more and 470 nm or less; and the ratio (A/B) of A and B is 1.00 or more and 1.46 or less, where A designates the optical intensity at a wavelength of 505 nm, and B designates the optical intensity at a wavelength of 620 nm.

4 Claims, 15 Drawing Sheets

(56) References Cited

U.S. PATENT DOCUMENTS

2019/0013445 A1* 1/2019 Leano, Jr. ............. H01L 33/507
2019/0137340 A1 5/2019 Ogino et al.

FOREIGN PATENT DOCUMENTS

| JP | S59-134965 U | 9/1984 | | |
|----|----|----|----|----|
| JP | S62-041146 U | 3/1987 | | |
| JP | H03-101091 U | 10/1991 | | |
| JP | H10-031192 A | 2/1998 | | |
| JP | 2001-083011 A | 3/2001 | | |
| JP | 2004-193581 A | 7/2004 | | |
| JP | 2011-124023 A | 6/2011 | | |
| JP | 2015-115507 A | 6/2015 | | |
| JP | 2017187756 A | * | 10/2017 | ............. G02B 21/34 |
| WO | 2014/042140 A1 | 3/2014 | | |
| WO | 2017/170910 A1 | 10/2017 | | |

OTHER PUBLICATIONS

Guttsait et al; "Simulation of LED Devices with High CRI;" 22nd International Crimean Conference; pp. 595-596; Sep. 10, 2012.
Yoon et al; "Tuning the diurnal natural daylight with phosphor converted white LED—Advent of new phosphor blend composition." Materials Science and Engineering B; vol. 193; pp. 4-12; Jul. 1, 2015.

* cited by examiner

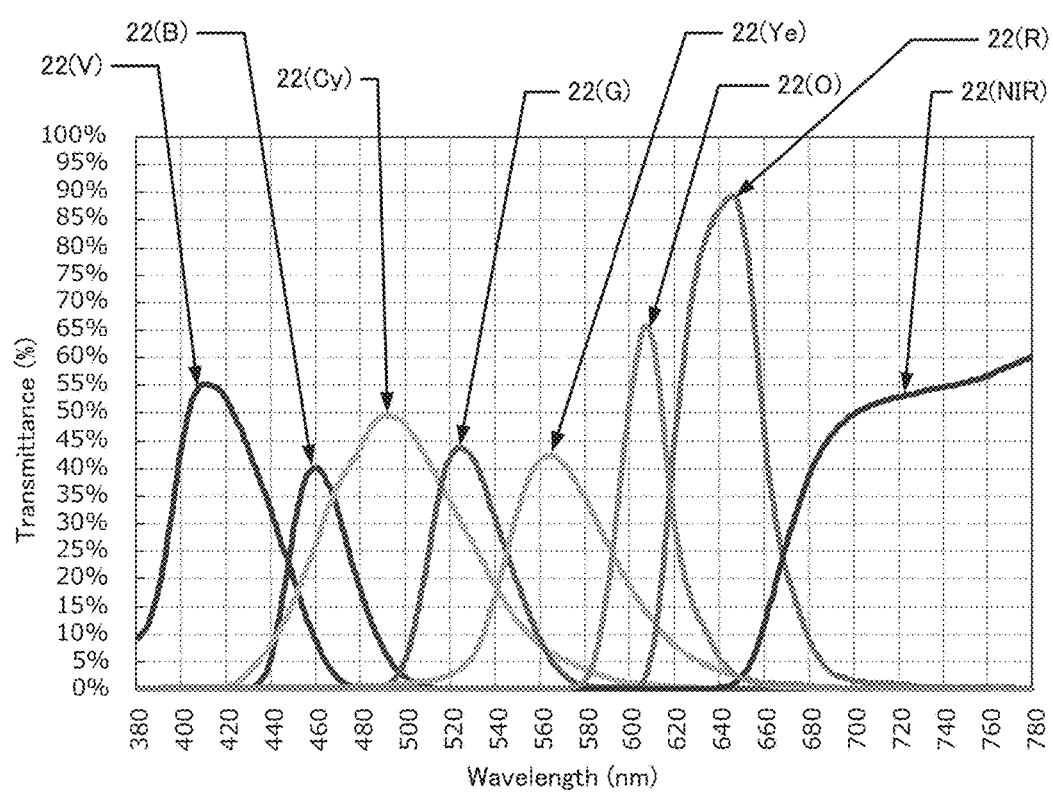

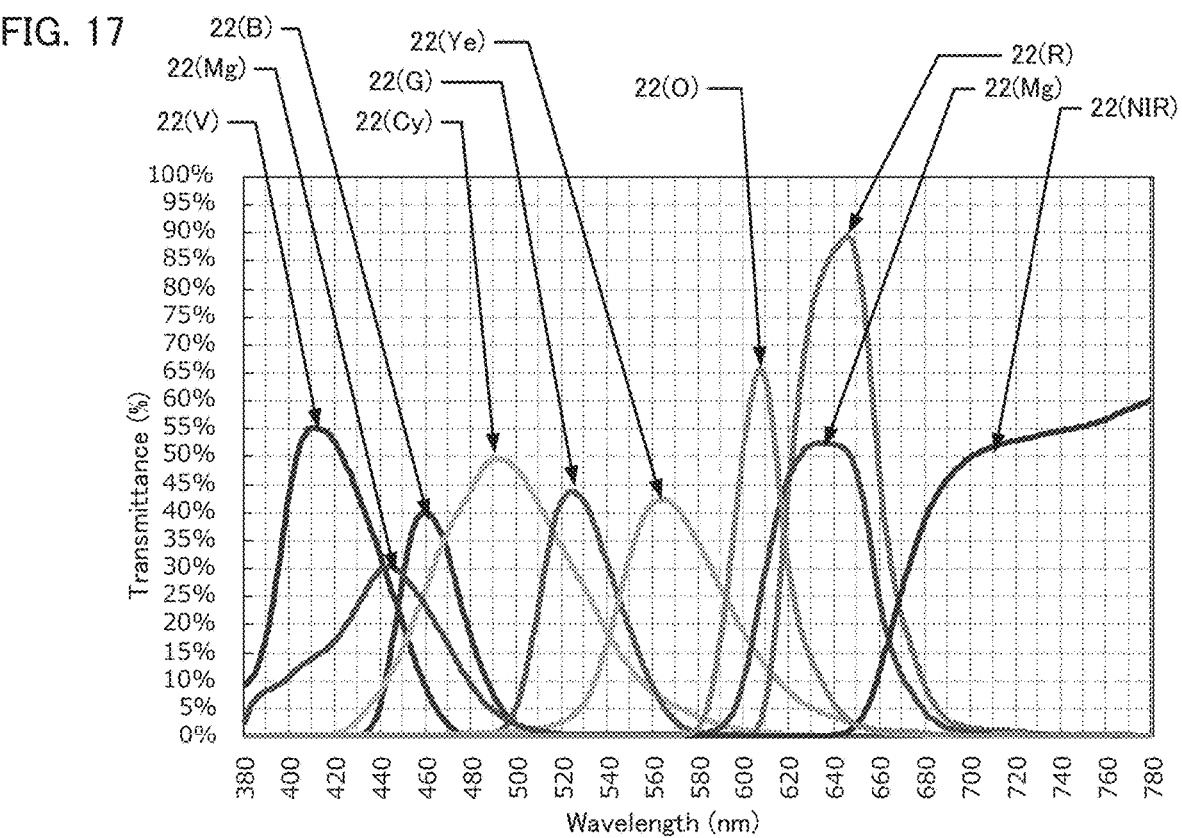

COLOR CALIBRATION VIEWER, AND COLOR CALIBRATION SET IN WHICH SAME IS USED

TECHNICAL FIELD

The present disclosure is related to a color calibration viewer and a color calibration set in which same is used.

BACKGROUND ART

In the field of imaging devices, output images are becoming increasingly high resolution, and regarding color, improvement of color reproducibility that faithfully reproduces color tones is being sought. The imaging device is such that in order to display output images with correct reproduced colors, the reproduced colors in the imaging device and the reproduced colors in the color calibration set are compared using the color calibration set, and when there is a difference in the reproduced colors, calibration is done on the basis of the color calibration set.

The color calibration set to be used for color calibration is equipped with a color chart constituted with a color bar in arbitrary colors, and a viewer that is a light source for irradiating the color chart (examples are in Patent Documents 1 to 7).

CITATION LIST

Patent Documents

Patent Document 1: Japanese Patent Application Laid-Open (JP-A) No. 2001-083011
Patent Document 2: JP-A No. H10-031192
Patent Document 3: Japanese Utility Model Application Laid-Open (JP-U) No. H03-101091
Patent Document 4: JP-U No. S62-041146
Patent Document 5: JP-U No. S59-134965
Patent Document 6: JP-U No. S59-134964
Patent Document 7: JP-U No. S59-073872

SUMMARY

Technical Problem

In an output images displayed by an imaging device, enlargement of color gamut has been intended in order to improve the color reproducibility. Along with this, regarding a color calibration set to be used for color calibration of the imaging device as well, enlargement of color gamut (hereinafter referred to as broadening the color gamut in some cases) has been demanded from the perspective of conducting more accurate color calibration. The color calibration set here indicates, for example, the set of a color chart and a viewer to be used for color calibration. The inventors of the present disclosure have been conducting research on a color chart with broadened color gamut in which the color gamut of the color chart to be used in such a color calibration set has been broadened. Meanwhile, the inventors of the present disclosure have found a new problem that a viewer corresponding to the color chart with broadened color gamut is necessary in order to conduct more accurate color calibration via an imaging device. Incidentally, as shown in Patent Documents 1 to 7 for example, a fluorescent light has been conventionally used as the viewer.

In consideration of the foregoing problems, it is a primary object of the present disclosure to provide a color calibration viewer that corresponds to the color chart with broad color gamut and is capable of conducting accurate color calibration of the imaging device.

Solution to Problem

The present disclosure provides a color calibration viewer used in color calibration, wherein the color calibration viewer is characterized in that: the relative intensity at a wavelength of 505 nm is 0.80 or more and 0.95 or less, and the relative intensity at a wavelength of 620 nm is 0.65 or more and 0.80 or less, where 1 designates the optical intensity of a peak top in a first wavelength region at a wavelength of 440 nm or more and 470 nm or less; and the ratio (A/B) of A and B is 1.00 or more and 1.46 or less, where A designates the optical intensity at a wavelength of 505 nm, and B designates the optical intensity at a wavelength of 620 nm.

With the present disclosure, it is possible to provide a color calibration viewer that corresponds to the color chart with broad color gamut and is capable of conducting accurate color calibration of the imaging device, in which specific spectrum characteristics are included and thus the light source can be close to CIE standard light source D65.

In the disclosure, it is preferable that the relative intensity of a peak top in a second wavelength region at a wavelength of 390 nm or more and 430 nm or less is 0.60 or more and 1.00 or less, where 1 designates the optical intensity at the peak top in the first wavelength region. Thus, it is possible to provide a color calibration viewer that corresponds to the color chart with broad color gamut and capable of conducting accurate color calibration of the imaging device, in which the light source can be closer to CIE standard light source D65.

In the disclosure, it is preferable that a LED, and a transmittance adjusting layer disposed at a surface from which the light of the LED emits are included. The combination of LED and the transmittance adjusting layer effectively allows the color calibration viewer to be close to CIE standard light source D65.

In the disclosure, it is preferable that the LED is a violet excitation LED, and the peak wavelength of the transmission spectrum is 390 nm or more and 415 nm or less. The combination of the violet excitation LED and the transmittance adjusting layer effectively allows the color calibration viewer to be close to CIE standard light source D65.

The present disclosure also provides a color calibration set characterized by comprising: the above described color calibration viewer; and a color chart for color calibration, wherein the color chart for color calibration includes a transparent substrate and a color bar group formed on the transparent substrate; and the color bar group is constituted by color bars of at least six colors of red, green, blue, a first color, a second color, and white arranged in a pattern in no particular order, coordinate points of the first color are within a region encompassed by the four points (0.351, 0.649), (0.547, 0.453), (0.380, 0.506) and (0.433, 0.464) on an xy chromaticity diagram; coordinate points of the second color are within a region encompassed by the four points (0.125, 0.489), (0.112, 0.229), (0.270, 0.407) and (0.224, 0.242) on an xy chromaticity diagram; and the peak wavelength of the transmission spectrum of the red color bar is 600 nm or more and 680 nm or less; the peak wavelength of the transmission spectrum of the green color bar is 495 nm or more and 570 nm or less; the peak wavelength of the transmission spectrum of the blue color bar is 430 nm or more and 490 nm or less; the peak wavelength of the transmission spectrum of the first color bar is 540 nm or more and 595 nm or less; and the peak wavelength of the transmission spectrum of the second color bar is 470 nm or more and 515 nm or less.

With the present disclosure, the above described color calibration viewer and color calibration chart with broad color gamut are included and thus accurate color calibration of the imaging device can be conducted.

Advantageous Effects

The present disclosure exhibits effects such that the color calibration viewer that corresponds to the color chart with broad color gamut and is capable of conducting accurate color calibration of the imaging device can be provided.

BRIEF DESCRIPTION OF DRAWINGS

FIG. 16 is an image graph showing another example of a split transmission spectrum shown by the color chart for color calibration.

FIG. 17 is an image graph showing another example of a split transmission spectrum shown by the color chart for color calibration.

DESCRIPTION OF EMBODIMENTS

The color calibration viewer and the color calibration set of the present disclosure will be hereinafter described.

I. Color Calibration Viewer

The color calibration viewer of the present disclosure has a structure to be used for color calibration, and features thereof is that the relative intensity at a wavelength of 505 nm is 0.80 or more and 0.95 or less, and the relative intensity at a wavelength of 620 nm is 0.65 or more and 0.80 or less, where 1 designates the optical intensity of a peak top in a first wavelength region at a wavelength of 440 nm or more and 470 nm or less; and the ratio (A/B) of A and B is 1.00 or more and 1.46 or less, where A designates the optical intensity at a wavelength of 505 nm, and B designates the optical intensity at a wavelength of 620 nm.

Figure 1:
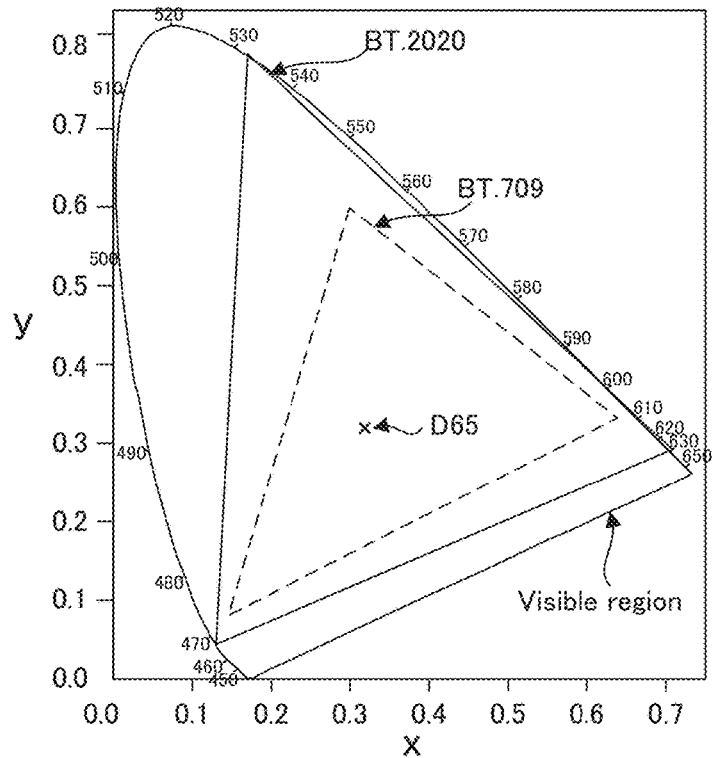
FIG. 1 is an xy chromaticity diagram for explaining the color gamut.
Figure 2:
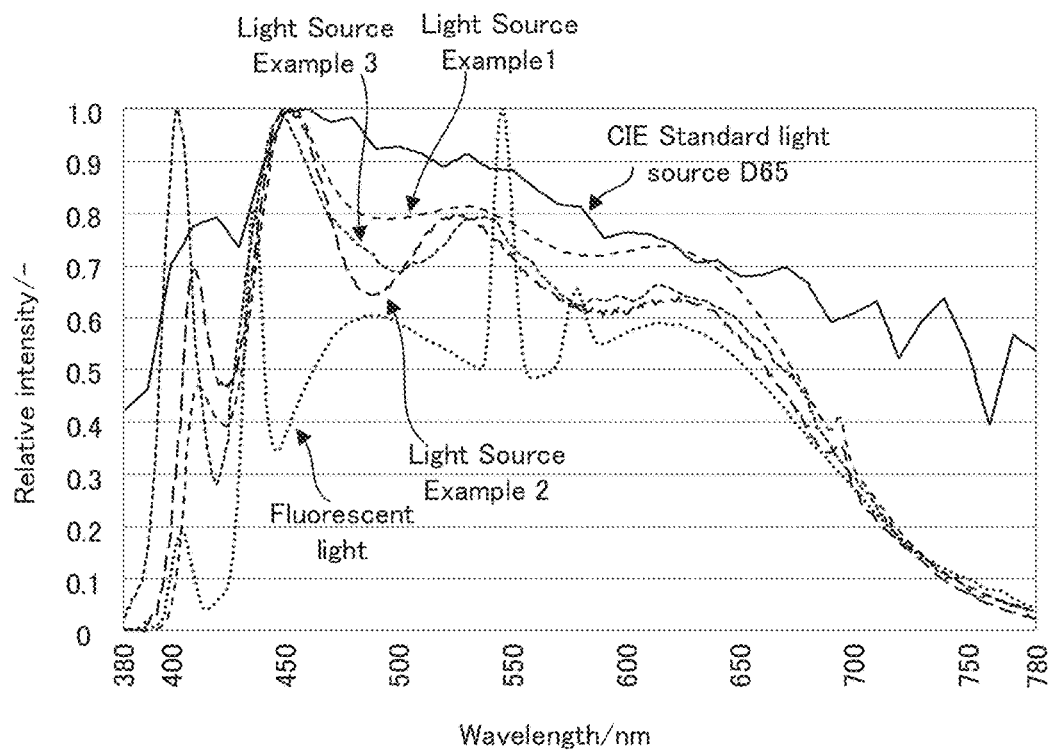
FIG. 2 is a graph showing the relative intensity at the wavelength of 380 nm or more and 780 nm or less, where 1 designates the optical intensity of a wavelength that becomes the maximum optical intensity.
Figure 3:
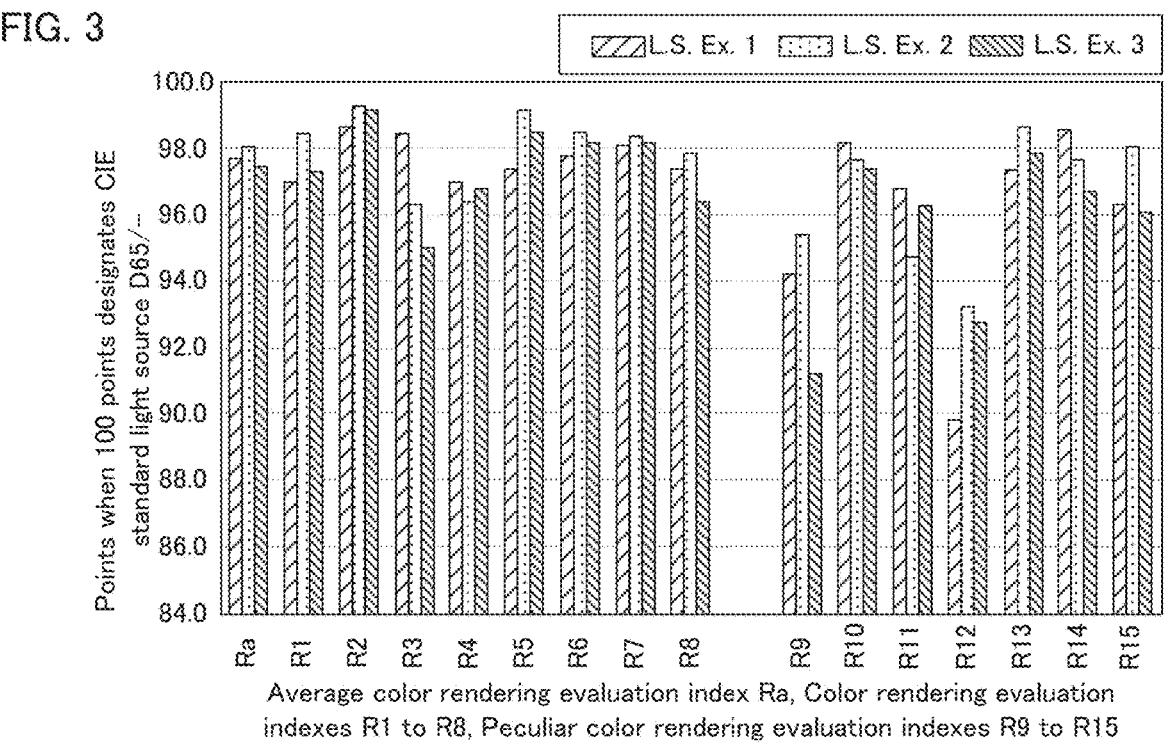
FIG. 3 is a graph showing an average color rendering evaluation index Ra, color rendering evaluation indexes R1 to R8, and peculiar color rendering evaluation indexes R9 to R15.
Figure 4:
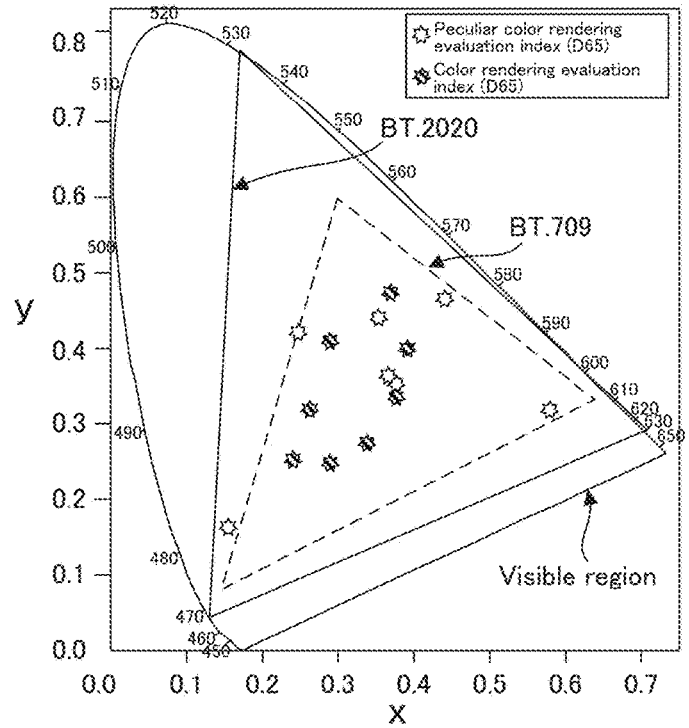
FIG. 4 is an xy chromaticity diagram for explaining the color rendering evaluation indexes and the peculiar color rendering evaluation indexes.
Figure 5:
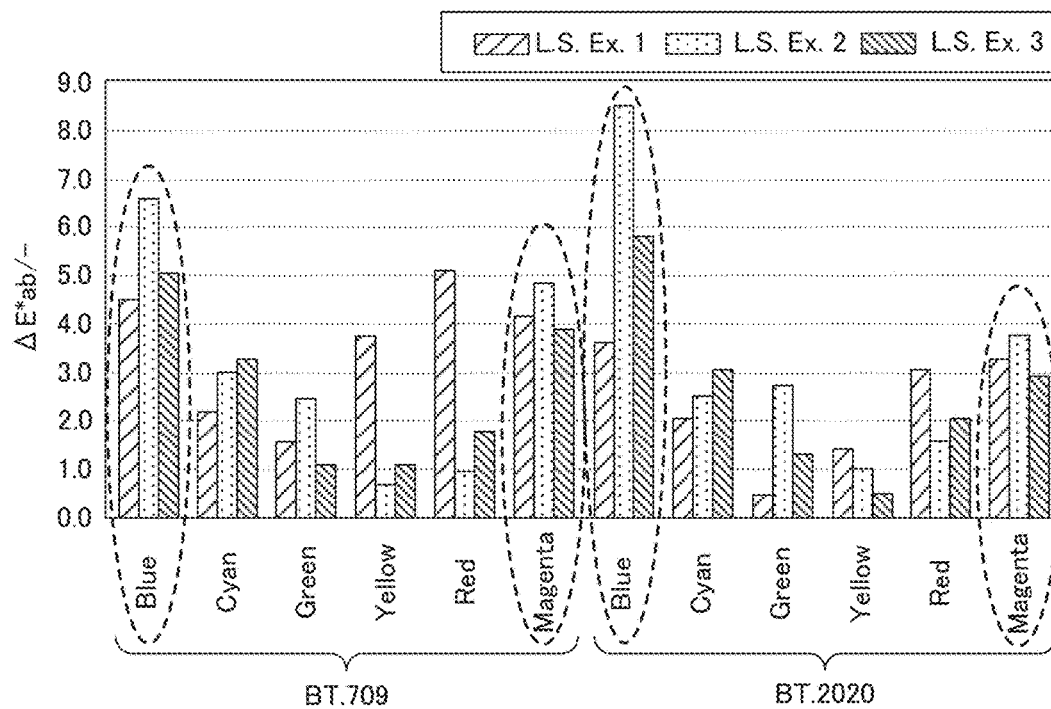
FIG. 5 is a graph showing color difference ΔE*ab in CIELAB space.
Figure 6:
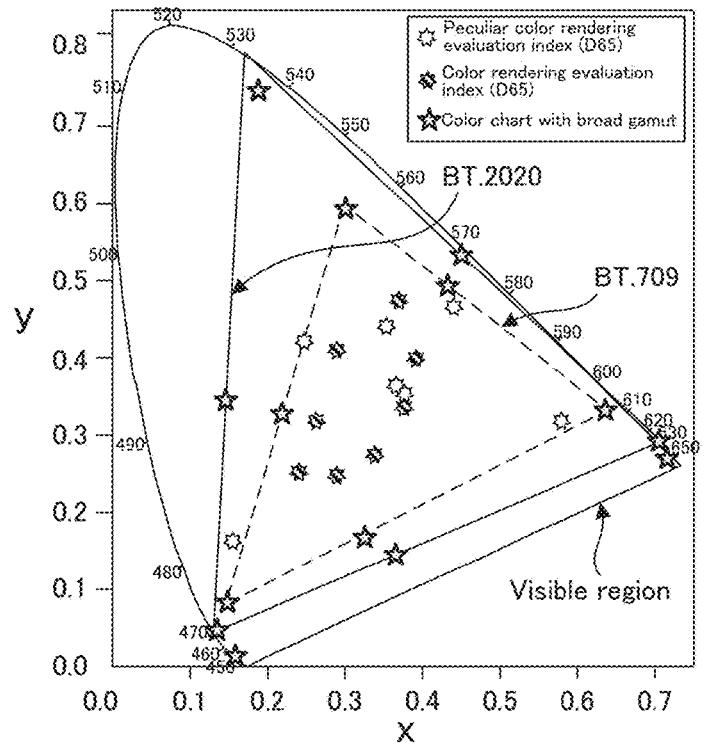
FIG. 6 is an xy chromaticity diagram for explaining the color chart with broad color gamut.
Figure 7:
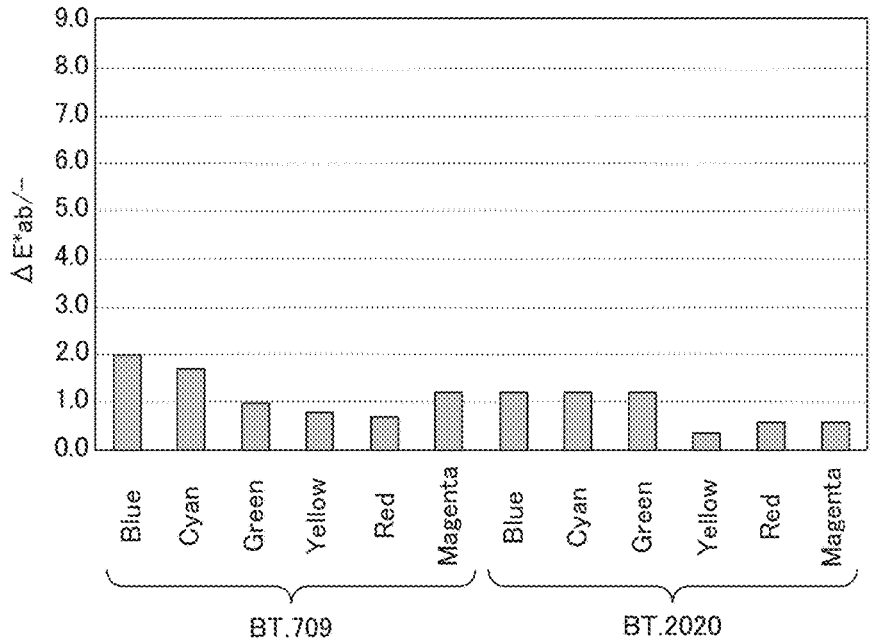
FIG. 7 is a graph showing color difference ΔE*ab in CIELAB space.
Figure 8:
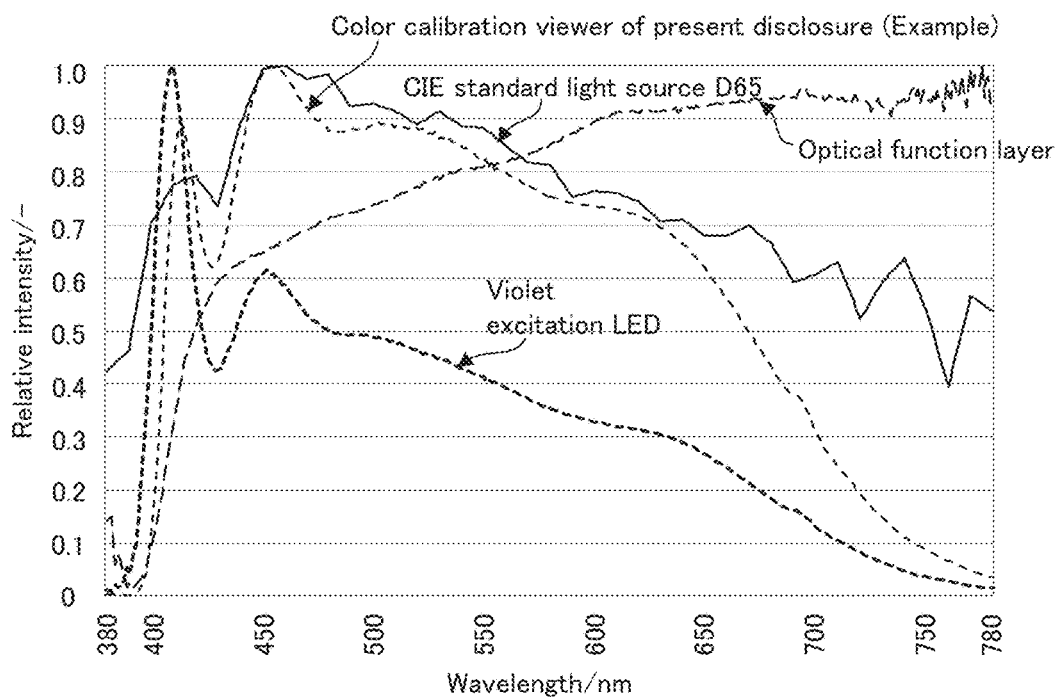
FIG. 8 is a graph showing the relative intensity at a wavelength of 380 nm or more and 780 nm or less, where 1 designates the optical intensity of a wavelength that becomes the maximum optical intensity.
Figure 9A:
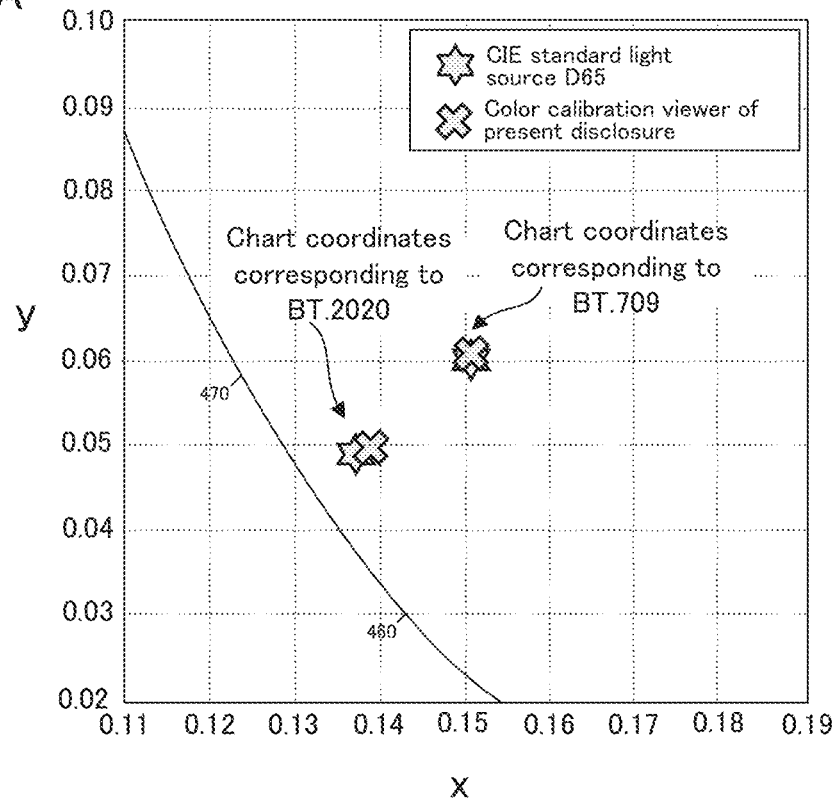
FIGS. 9A and 9B are xy chromaticity diagrams for explaining the color calibration viewer of the present disclosure.
Figure 9B:
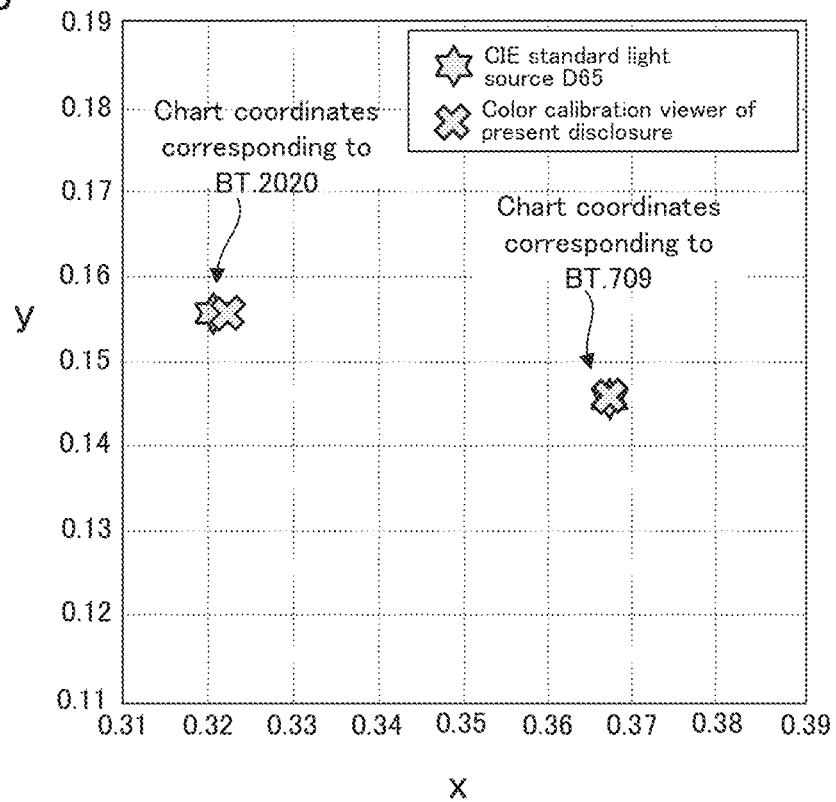

The color calibration viewer of the present disclosure will be described with reference to the drawings. FIG. 1 is an xy chromaticity diagram for explaining the color gamut. FIG. 2 is a graph showing the relative intensity at the wavelength of 380 nm or more and 780 nm or less, where 1 designates the optical intensity of a wavelength that becomes the maximum optical intensity. FIG. 3 is a graph showing an average color rendering evaluation index Ra, color rendering evaluation indexes R1 to R8, and peculiar color rendering evaluation indexes R9 to R15. FIG. 4 is an xy chromaticity diagram for explaining the color rendering evaluation indexes and the peculiar color rendering evaluation indexes. FIG. 5 is a graph showing color difference ΔE*ab in CIELAB space. FIG. 6 is an xy chromaticity diagram for explaining the color chart with broad color gamut. FIG. 7 is a graph showing color difference ΔE*ab in CIELAB space. FIG. 8 is a graph showing the relative intensity at the wavelength of 380 nm or more and 780 nm or less, where 1 designates the optical intensity of a wavelength that becomes the maximum optical intensity. FIGS. 9A and 9B are xy chromaticity diagrams for explaining the color calibration viewer of the present disclosure.

Conventionally, in an output images displayed by an imaging device, enlargement of color gamut has been intended in order to improve the color reproducibility. It means that the colors reproduced by the imaging device has been broadened. The "color gamut" is a specified range out of the visible region, and for example as shown in FIG. 1, can be expressed using the xy chromaticity diagram of the XYZ color system (CIE 1931 XYZ color space) established by the International Commission on Illumination (CIE). In the xy chromaticity diagram, the color gamut can be indicated by a triangle formed by establishing chromaticity coordinates that are the peaks of each of the colors R, G and B and linking these with straight lines. Color gamuts conventionally have been established through various color gamut standards, and in the video industry including imaging device, for example, BT. 709 and BT. 2020 standard as shown in FIG. 1 that cover the broad color is used. Also, in the xy chromaticity diagram shown in FIG. 1, CIE standard light source D65 that becomes white dots are shown as plot "x".

The imaging device is such that in order to display output images with correct reproduced colors, the reproduced colors in the imaging device and the reproduced colors in the color calibration set are compared using the color calibration set, and when there is a difference in the reproduced colors, calibration is done on the basis of the color calibration set. Thus, in order to conduct more accurate color calibration, along with the colors broadened in the color reproduction by the imaging device, it is also necessary to broaden colors reproduced by the color calibration set. In consideration of the foregoing, the inventors of the present disclosure have been conducting research on a color chart with broad color gamut in which the color gamut of the color chart to be used in a color calibration set has been broadened. In specific, they have been conducting research on the color chart with broad color gamut corresponding to the above described BT. 709 and BT. 2020 standard. Meanwhile, in the color calibration set, as a color calibration viewer for irradiating the color chart, a fluorescent light has been conventionally used, and particular research thereon has not been conducted in the present circumstances. Then, the inventors of the present disclosure have examined the color calibration viewer. In specific, as the color calibration viewer, they have examined alight source close to CIE standard light source D65 which is an ideal light source.

First, the inventors of the present disclosure have compared the transmission spectrum of the fluorescent light conventionally used as the color calibration viewer, to the transmission spectrum of CIE standard light source D65 which is the ideal light source. As the result, as shown in FIG. 2, it has been found out that the waveforms of the transmission spectrum of CIE standard light source D65 and the transmission spectrum of the fluorescent light are greatly different from each other. Also, it has been confirmed that there is an emission line in the transmission spectrum of the fluorescent light. In the case of the fluorescent light having the transmission spectrum where the emission line is present, the saturation of the targeted object may be dramatically increased in some cases, and thus it cannot be said it would definitely match the vision of the colors in nature. In this manner, it has been found out that the fluorescent light conventionally used as the color calibration viewer cannot be said the light source close to CIE standard light source D65.

Then, the inventors of the present disclosure has prepared a light source of three kinds of LED as a light source replacing the fluorescent light, measured the transmission spectra of Examples using the said light source of three kinds of LED (Light Source Example 1 to Light Source Example 3), and compared thereof to the transmission spectrum of CIE standard light source D65. As the result, as shown in FIG. 2, although an emission line did not appeared in the transmission spectra of Light Source Example 1 to Light Source Example 3, the waveforms thereof were greatly different from that of CIE standard light source D65; thus it has been found out that Light Source Example 1 to Light Source Example 3 cannot be said the light source close to CIE standard light source D65.

The inventors of the present disclosure has conducted further evaluation on Light Source Example 1 to Light Source Example 3. The evaluations on Light Source Example 1 to Light Source Example 3 have been conducted using "an average color rendering evaluation index", "color rendering evaluation indexes", and "peculiar color rendering evaluation indexes" used in general light source evaluations. In specific, the color difference of CIE standard light source D65 from the light source of three kinds of LED has been compared using the average color rendering evaluation index Ra, the color rendering evaluation indexes R1 to R8, and the peculiar color rendering evaluation indexes R9 to R15. As the result, as shown in FIG. 3, the average color rendering evaluation index Ra, that is the average of the color rendering evaluation indexes R1 to R8 regarding all three kinds of light source examples has showed higher value than 97; the result obtained has showed high color rendering properties.

The inventors of the present disclosure has repeatedly conducted examination further based on the obtained result the average color rendering evaluation index Ra regarding Light Source Example 1 to Light Source Example 3 has showed 97 or higher and showed high color rendering properties, although it has been found out in the obtained result that Light Source Example 1 to Light Source Example 3 cannot be said the light source close to CIE standard light source D65 since the waveforms of the transmission spectra thereof are greatly different from that of CIE standard light source D65 as described above. As the result, a new problem has been found out as follows. That is, since "test colors" R1 to R8 used for the color rendering evaluation indexes are average representative colors of many objects, they are designed in colors of middle saturation. In the meantime, since present imaging devices have imaging technique capable of expressing extremely high saturation and broad color gamut, high saturation and broad color gamut have been required for the color calibration set used in the said imaging devices. Upon evaluating the color calibration viewer in such a color calibration set, a new problem arose is that just the evaluation in the middle saturation using the color rendering indexes may be insufficient.

Incidentally, the fact that the color rendering evaluation indexes R1 to R8 and the peculiar color rendering evaluation indexes R9 to R15 are the evaluation in middle saturation is obvious from the xy chromaticity diagram shown in FIG. 4, in which the color rendering evaluation indexes R1 to R8 and the peculiar color rendering evaluation indexes R9 to R15 of CIE standard light source D65 are plotted in a narrower region than BT. 709 and BT. 2020 standards, which means it is not sufficiently corresponding to the broad color gamut of BT. 709 and BT. 2020 standards.

In order to conduct evaluation in high saturation, the inventors of the present disclosure who found out the above problem have used the transmittance data of the color chart with broad color gamut corresponding to BT. 709 and BT. 2020 standard, obtained the color difference $\Delta E^*ab$ of CIE standard light source D65 from Light Source Example 1 to Light Source Example 3 in CIELAB space and evaluated thereof. As the result, as shown in FIG. 5, it has been found out that large deviations arose in color difference particularly in Blue and Magenta regions. Also, since such a result has been obtained, it has been clarified that evaluations with just the average color rendering evaluation index Ra, the color rendering evaluation indexes R1 to R8, and the peculiar color rendering evaluation indexes R9 to R15 are insufficient for evaluating the color calibration viewer in the color calibration set with broadened color gamut. Further, the inventors of the present disclosure have obtained a new knowledge that when it is a light source for which excellent result can be obtained in the evaluation conducted for Light Source Example 1 to Light Source Example 3 explained in FIG. 5, the light source is closer to CIE standard light source D65 and it can be used in the color calibration viewer as the light source corresponding to the broadened color gamut. The present disclosure has been made based on the above knowledge.

Incidentally, the color difference ΔE*ab is a value obtained from a color difference formula (ΔE*ab={(ΔL*)²+ (Δa*)²+(Δb*)²}^{1/2} according to (L*, a*, b*) space color system of CIE1976 standard. Also, L*, a*, and b* are calculated using the below formula and converting from tri-stimulus value X, Y, and Z.

$$L^* = 116(Y/Yn)^{1/3} - 16$$

$$a^* = 500\{(X/Xn)^{1/3} - (Y/Yn)^{1/3}\}$$

$$b^* = 200\{(Y/Yn)^{1/3} - (Z/Zn)^{1/3}\}$$

Here, function f(X/Xn) is defined by $$f(X/Xn) = (X/Xn)^{1/3} (X/Xn > 0.008856) \text{ and}$$

$$f(X/Xn) = 7.787(X/Xn) + 16/116 (X/Xn \leq 0.008856).$$

Incidentally, functions f(Y/Yn) and f(Z/Zn) are defined in the same manner. In the formula, Xn, Yn, and Zn are complete reflection face tri-stimulus value, which is stipulated as Yn=100. Meanwhile, the formula is used in the range of X/Xn>0.008856, Y/Yn>0.008856, and Z/Zn>0.008856; for the range other than this, the following correction formula is used.

$$L^* = 116 f(Y/Yn) - 16$$

$$a^* = 500\{f(X/Xn) - f(Y/Yn)\}$$

$$b^* = 200\{f(Y/Yn) - f(Z/Zn)\}$$

Also, on the vertical axis ΔE*ab in the graph shown in FIG. 5, the range less than 3.2 (1.6<ΔE*ab<3.2) is called class-A allowable color difference, which is in a level generally recognized as the same color. Also, the range in which ΔE*ab is 3.2 or more and 6.5 or less (3.2≤ΔE*ab≤6.5) is called class-B allowable color difference, which is in a level able to be handled as the same color in impression, and the range out of these (6.5<ΔE*ab<13.0) is called class-C allowable color difference, which is in a level one senses color difference corresponding to one step degree in a color chart such as JIS standard color chart and Munsell color chart.

Further, the color chart with broad color gamut used for the evaluation shown in FIG. 5 has been designed by the inventors of the present disclosure, which corresponds to BT. 709 and BT. 2020 standard in an xy chromaticity diagram as shown in FIG. 6. Incidentally, in the color chart with broad color gamut, the area rate corresponding to BT. 709 standard is 100%, and the area rate corresponding to BT. 2020 standard is 98%. The details of such a color chart with broad color gamut may be the same as those of the color chart for color calibration described in the section "II. Color calibration set" later; thus, the descriptions herein are omitted.

The present disclosure provides a color calibration viewer wherein the relative intensity at a wavelength of 505 nm is 0.80 or more and 0.95 or less, and the relative intensity at a wavelength of 620 nm is 0.65 or more and 0.80 or less, where 1 designates the optical intensity of a peak top in a first wavelength region at a wavelength of 440 nm or more and 470 nm or less; and the ratio (A/B) of A and B is 1.00 or more and 1.46 or less, where A designates the optical intensity at a wavelength of 505 nm, and B designates the optical intensity at a wavelength of 620 nm, and thus excellent result may be obtained in the evaluation conducted to Light Source Example 1 to Light Source Example 3 explained in FIG. 5. In specific, as shown in FIG. 7, ΔE*ab was the value less than 3.2 in all color regions in CIELAB space. Also, when the emission spectrum of the color calibration viewer of the present disclosure was measured and compared to the emission spectrum of CIE standard light source D65, it has been found out that the waveform was particularly close to the waveform of CIE standard light source D65 in the region around the wavelength of 430 nm or more and 650 nm or less, as shown in FIG. 8. Further, in order to confirm that the color calibration viewer of the present disclosure is close to CIE standard light source D65, coordinates on an xy chromaticity diagram of samples corresponding to BT. 709 and BT. 2020 standard were respectively calculated from the color calibration viewer and CIE standard light source D65, and compared to each other. As the result, as shown in FIGS. 9A and 9B, it has been found out that the coordinates calculated from the color calibration viewer of the present disclosure almost match the coordinates calculated from CIE standard light source D65. From this, it has been clarified that the color calibration viewer of the present disclosure is close to CIE standard light source D65.

Below, the color calibration viewer of the present disclosure will be described.

A. Spectrum Properties of Color Calibration Viewer

The color calibration viewer of the present disclosure has a structure to be used for color calibration, and features thereof is that the relative intensity at a wavelength of 505 nm is 0.80 or more and 0.95 or less, and the relative intensity at a wavelength of 620 nm is 0.65 or more and 0.80 or less, where 1 designates the optical intensity of a peak top in a first wavelength region at a wavelength of 440 nm or more and 470 nm or less; and the ratio (A/B) of A and B is 1.00 or more and 1.46 or less, where A designates the optical intensity at a wavelength of 505 nm, and B designates the optical intensity at a wavelength of 620 nm.

The optical intensity of the color calibration viewer of the present disclosure is measured using SR-3 or SR-3AR from TOPCON CORPORATION under the measurement conditions as below.

<Measurement Conditions>
Measurement distance: Distance from the light emitting surface to the lens of the measurement device is 1200 mm.
Measurement angle: 0.1°;
Measurement mode: Auto;
Measurement environment: Darkroom 1 lx or less (0.5 lx or less is desirable);
Measurement surface: The center of the light emitting surface is measured.
Measurement environment: temperature of 20° C. to 30° C., humidity of 80% or less.

Incidentally, prior to the measurement, since it is necessary to stabilize the color temperature of LED light source, the measurement was conducted after 30 minutes or more of stabilization waiting time from when the electricity of LED light source was turned on.

Figure 10:
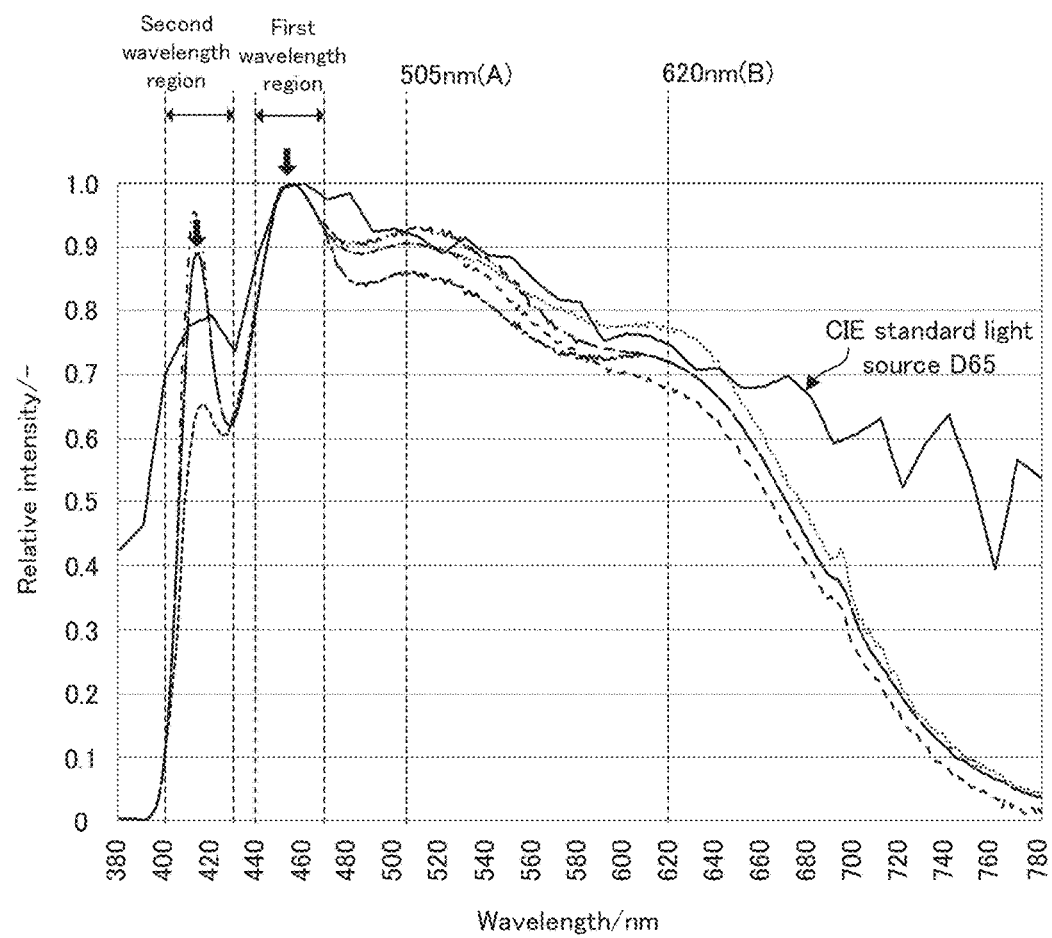
FIG. 10 is a graph showing the simulation result for stipulating the optical spectrum properties of the color calibration viewer of the present disclosure.

The "peak top in a first wavelength region" here indicates the peak top in the region of the wavelength 440 nm or more and 470 nm or less, that is the first wavelength region; for example, it is indicated as the arrowed point in the first wavelength region shown in FIG. 10. Incidentally, FIG. 10 is a graph showing the simulation result for stipulating the optical spectrum properties of the color calibration viewer of the present disclosure.

The first wavelength region is the region in the wavelength of 440 nm or more and 470 nm or less, and the first wavelength region may be, for example, wavelength of 445 nm or more, and may be wavelength of 450 nm or more. Also, the first wavelength region may be, for example, wavelength of 465 nm or less, and may be 460 nm or less. Further, the first wavelength region may be wavelength of 454 nm.

In the color calibration viewer of the present disclosure, the relative intensity at the wavelength of 505 nm is 0.80 or more and 0.95 or less where 1 designates the optical intensity at the peak top in the first wavelength region. The relative intensity at the wavelength of 505 nm may be, for example, 0.857 or more, and may be 0.926 or less as well. Incidentally, the relative intensity at the wavelength of 505 nm where 1 designates the optical intensity at the peak top in the first wavelength region may be calculated from the measurement results of the optical intensities.

In the color calibration viewer of the present disclosure, the relative intensity at the wavelength of 620 nm is 0.65 or more and 0.80 or less, where 1 designates the optical intensity at the peak top in the first wavelength region. The relative intensity at the wavelength of 620 nm may be, for example, 0.677 or more, and may by 0.773 or less as well. Incidentally, the relative intensity at the wavelength of 620 nm where 1 designates the optical intensity at the peak top in the first wavelength region may be calculated from the measurement results of the optical intensities.

In the color calibration viewer of the present disclosure, the ratio (A/B) of A and B is 1.00 or more and 1.46 or less, where A designates the optical intensity at the wavelength of 505 nm, and B designates the optical intensity at the wavelength of 620 nm. The ratio (A/B) of A and B may be, for example, 1.11 or more, and may be 1.37 or less as well.

In the color calibration viewer of the present disclosure, it is preferable that a peak top in a second wavelength region at a wavelength of 390 nm or more and 430 nm or less is 0.60 or more and 1.00 or less, where 1 designates the optical intensity at the peak top in the first wavelength region. Thereby, the color calibration viewer may be closer to CIE standard light source D65. The relative intensity at the peak top in the second wavelength region may be, for example, 0.638 or more, and may be 0.950 or less as well.

The "peak top in a second wavelength region" here indicates the peak top in the region of the wavelength 390 nm or more and 430 nm or less, that is the second wavelength region; for example, it is indicated as the arrowed point in the second wavelength region shown in FIG. 10.

The second wavelength region is in the region of wavelength 390 nm or more and 430 nm or less, and the second wavelength region may be, for example, wavelength of 400 nm or more, and may be wavelength of 405 nm or more. Also, the second wavelength region may be, for example, 420 nm or less, and may be 415 nm or less. Further, the second wavelength region may be wavelength of 413 nm.

In the color calibration viewer of the present disclosure, it is preferable that the relative intensity at the wavelength of 560 nm is 0.70 or more and 0.85 or less where 1 designates the optical intensity at the peak top in the first wavelength region. The relative intensity at the wavelength of 560 nm may be, for example, 0.755 or more, and may be 0.824 or less as well. Incidentally, the relative intensity at the wavelength of 560 nm where 1 designates the optical intensity at the peak top in the first wavelength region may be calculated from the measurement results of the optical intensities.

B. Structure of Color Calibration Viewer

Figure 11:
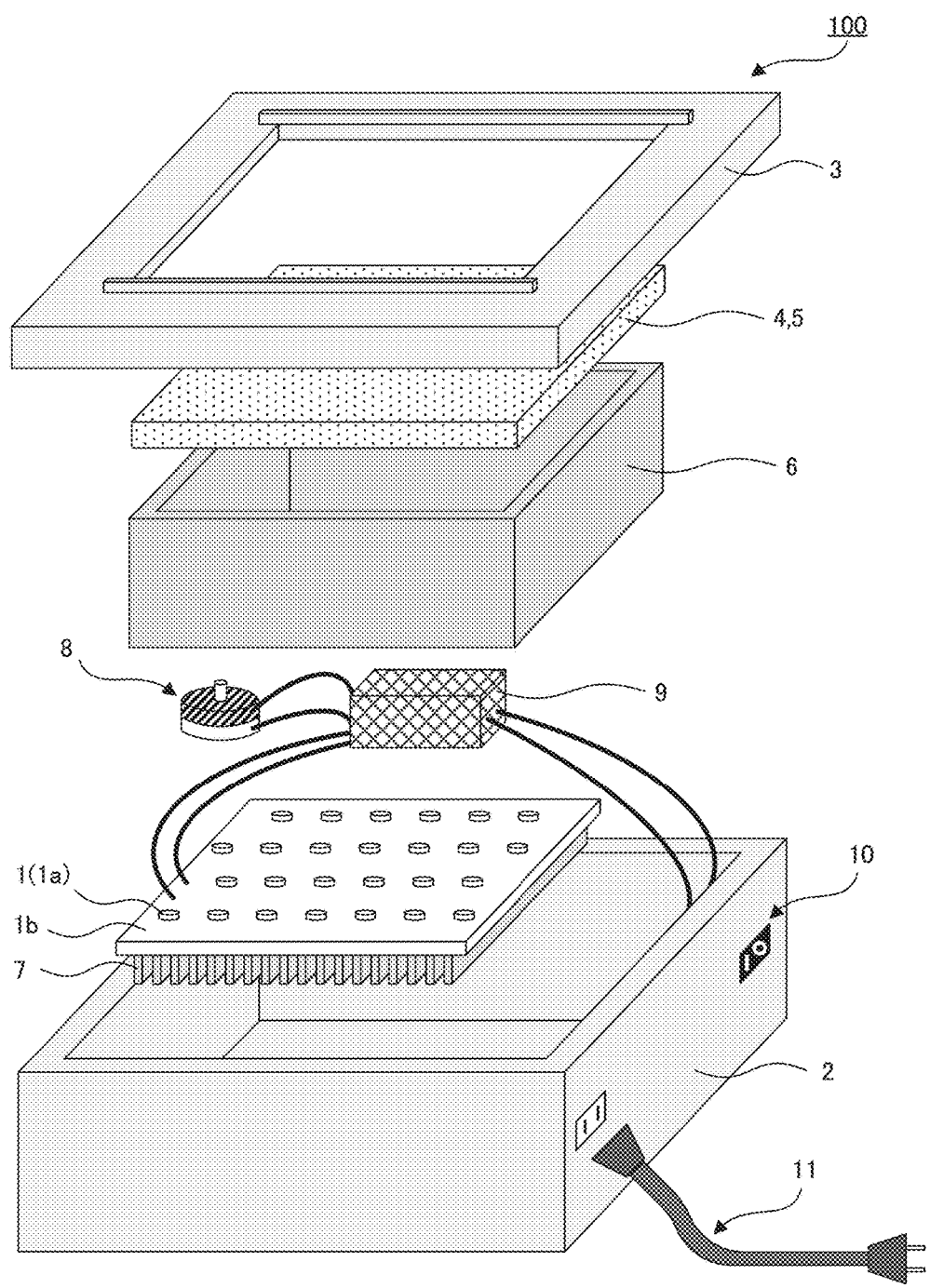
FIG. 11 is a schematic diagram showing an example of the color calibration viewer of the present disclosure.

There are no particular limitations on the structure of the color calibration viewer of the present disclosure if the above described specific spectrum properties may be obtained. The structure of the color calibration viewer will be described with reference to the drawings. FIG. 11 is a schematic diagram showing an example of the color calibration viewer of the present disclosure. As shown in FIG. 11, color calibration viewer 100 includes, for example, housing body 2 where light source 1 is disposed, and upper lid 3 in which an opening is formed on the surface where light is emitted from light source 1. Also, on the side of surface to which the light is emitted from light source 1, transmittance adjusting layer 4, light diffusing board 5, and luminance distribution adjusting board 6 may be disposed. Incidentally, FIG. 11 is an example of using LED chip $1a$ as light source 1. Also, LED chip $1a$ is disposed at the side of one surface of LED substrate $1b$, and heat sink 7 is provided at the other side surface opposite to the surface where LED chip $1a$ is disposed on LED substrate $1b$. Further, light source 1 is electrically connected by light controlling circuit 8 and converter 9 interposing housing body 2. In FIG. 11, reference sign 10 shows a power switch, and reference sign 11 shows a power cable.

There are no particular limitations on the light source if it is a member that can be used in the color calibration set, and can irradiate light to the color chart. Examples of such a light source may include an LED and an organic EL, and usage of the LED is particularly preferable. The "LED" here is the general term of a light emitting diode, and the "EL" is the general term of an electroluminescence.

The LED is a light emitting element that gives a function as a light source to the color calibration viewer. As the LED, generally known one may be appropriately selected; however, for example, it is preferable to select the one that allows the color calibration viewer to exhibit the above described spectrum properties. It means that the LED is preferably selected depending on the spectrum properties of the LED itself. In the present disclosure, for example, the LED that can emit white light is preferably used, and specific examples thereof may include a violet excitation LED and a blue excitation LED. Also, examples may include a complex product of LED that emits white light using the combination of plurality of LED having different spectra such as a red LED, a green LED, and a blue LED. In the present disclosure, usage of the violet excitation LED is particularly preferable.

The violet excitation LED is configured by, for example, combination of a violet LED chip with a plurality of fluorescent body, and has an emission spectrum as shown in FIG. 8. Incidentally, the method for measuring the optical intensity of the violet excitation LED may be the same as the method for measuring the optical intensity of the color calibration viewer described above; thus, the descriptions herein are omitted.

The transmittance adjusting layer is a layer that has a function of adjusting the transmittance with respect to each wavelength of light emitted from the light source. When such a transmittance adjusting layer is used with a light source, it is possible to adjust the light emitted from the light source to show the desired emission spectrum. Accordingly, by using the transmittance adjusting layer with the light source, the color calibration viewer can be close to CIE standard light source D65.

The transmittance adjusting layer may be used together with a functional layer that has other functions as required. In the case of using the transmittance adjusting layer together with the functional layer that has other functions, for example, it is preferably used together with a light diffusing layer that has a light diffusing function to diffuse light emitted from the light source. Also, in the case of using the transmittance adjusting layer together with the light diffusing layer, the transmittance adjusting layer and the light diffusing layer may be separate bodies, and may be a single body. In the latter case, the transmittance adjusting layer is to have the light diffusing function as the light diffusing layer. Specific examples thereof may include an example where the transmittance adjusting layer having the light diffusing function as the light diffusing layer is combined with the violet excitation LED having the emission spectrum as shown in FIG. 8. In this case, the color calibration viewer may obtain the spectrum properties as shown in FIG. 8. The emission spectrum of the color calibration viewer may be calculated from multiplying the transmission spectrum of the light source by the transmission spectrum of the transmittance adjusting layer. Incidentally, the transmission adjusting layer in FIG. 8 has the light diffusing function, which is an example using so-called light diffusing layer. Also, the transmittance spectrum of the light diffusing layer may be calculated from the method as follows. First, LED and fluorescent light are used as a light source and the spectrum data thereof is measured by a spectral radiometer. In that status, the light diffusing layer is disposed between the light source and the spectral radiometer to measure the spectrum data. The spectrum that the light diffusing layer transmits may be calculated from dividing the spectrum data obtained by combining the light source and the light diffusion layer, by the original light source spectrum data for each wavelength.

A material for the light diffusing layer may be a material that is capable of exhibiting desired light diffusing function, and generally known materials may be used. The light diffusing layer may, for example, include a transparent resin and light diffusing particles dispersed to the transparent resin. Examples of the transparent resin may include a thermosetting resin such as a two-component curable type urethane-based resin and an epoxy-based resin; a thermoplastic resin such as an acrylic resin, a vinyl chloride—vinyl acetate copolymer, and a styrene-based resin; as well as an ionizing radiation curable resin that is cured by ionizing radiation such as electron ray and ultraviolet ray. Examples of the light diffusing particles may include particles such as silica (silicon oxide), alumina (aluminum oxide), an acrylic resin, and a polycarbonate resin. Incidentally, the average particle size (average diameter) of a single particle of these may be approximately 0.5 μm or more and 100 μm or less. Also, the particle shape may be in a shape such as sphere, spheroid, polyhedron, truncated polyhedron, scale-like shape, and needle shape. Incidentally, in the present disclosure, other than the above, a layer having the light diffusing function may be used as the light diffusing layer; for example, a light diffusing layer disclosed in JP-A No. 2011-124023 may be exemplified.

The color calibration viewer of the present disclosure may have an additional structure other than the above described light source and transmittance adjusting layer, as required. Examples of the additional structure may include luminance distribution adjusting board 6 as shown in FIG. 11. The luminance distribution adjusting board is a member for improving the uniformity of luminance of the light emitting surface in the light source, which may include a light adjusting circuit for adjusting luminance.

C. Luminance Characteristics of Color Calibration Viewer

The color calibration viewer of the present disclosure is used as the light source in the later described color calibration set. There are no particular limitations on the luminance characteristics of the color calibration viewer if it is to the extent that can be used as the light source of the color calibration set. For example, center color temperature of the color calibration viewer may be 6179 K or more and 6829 K or less. Incidentally, the center color temperature may be measured with, for example, a spectral radiance meter CS-2000 from KONICA MINOLTA JAPAN, INC., and a 2D spectral radiometer SR-5000 from TOPCON CORPORATION. Also, the center brightness of the color calibration viewer may be, for example, 450 cd/m$^2$ or more and 5300 cd/m$^2$ or less, and may be 850 cd/m$^2$ or more and 4600 cd/m$^2$ or less. Incidentally, the center brightness may be measured with, for example, a two dimensional color brightness meter CA-2000 from KONICA MINOLTA JAPAN, INC., and a 2D spectral radiometer SR-5000 from TOPCON CORPORATION.

D. Applications of Color Calibration Viewer

The color calibration viewer of the present disclosure is used for color calibration. Incidentally, the color calibration set is described in the section "II. Color calibration set" later; thus, the descriptions herein are omitted.

II. Color Calibration Set

The color calibration set of the present disclosure comprises: the above described color calibration viewer; and a color chart for color calibration, wherein the color chart for color calibration includes a transparent substrate and a color bar group formed on the transparent substrate; and the color bar group is constituted by color bars of at least six colors of red, green, blue, a first color, a second color, and white arranged in a pattern in no particular order, coordinate points of the first color are within a region encompassed by the four points (0.351, 0.649), (0.547, 0.453), (0.380, 0.506) and (0.433, 0.464) on an xy chromaticity diagram; coordinate points of the second color are within a region encompassed by the four points (0.125, 0.489), (0.112, 0.229), (0.270, 0.407) and (0.224, 0.242) on an xy chromaticity diagram; and the peak wavelength of the transmission spectrum of the red color bar is 600 nm or more and 680 nm or less; the peak wavelength of the transmission spectrum of the green color bar is 495 nm or more and 570 nm or less; the peak wavelength of the transmission spectrum of the blue color bar is 430 nm or more and 490 nm or less; the peak wavelength of the transmission spectrum of the first color bar is 540 nm or more and 595 nm or less; and the peak wavelength of the transmission spectrum of the second color bar is 470 nm or more and 515 nm or less.

With the color calibration set of the present disclosure, the above described color calibration viewer and the specific color calibration chart are included and thus accurate color calibration of the imaging device can be conducted. Incidentally, specific descriptions of the effect may be in the same contents as those described in the section "I. Color calibration viewer" above; thus, the descriptions herein are omitted.

A. Color Calibration Viewer

As the color calibration viewer in the present disclosure, the one described in the section "I. Color calibration viewer" above may be used. It means that the color calibration viewer in the present disclosure has a structure to be used for color calibration, and features thereof is that the relative intensity at a wavelength of 505 nm is 0.80 or more and 0.95 or less, and the relative intensity at a wavelength of 620 nm is 0.65 or more and 0.80 or less, where 1 designates the optical intensity of a peak top in a first wavelength region at a wavelength of 440 nm or more and 470 nm or less; and the ratio (A/B) of A and B is 1.00 or more and 1.46 or less, where A designates the optical intensity at a wavelength of 505 nm, and B designates the optical intensity at a wavelength of 620 nm. Incidentally, the descriptions of the color calibration viewer may be in the same contents as those described in the section "I. Color calibration viewer" above; thus, the descriptions herein are omitted.

B. Color Chart for Color Calibration

The color chart for color calibration in the present disclosure comprises: a transparent substrate and a color bar group formed on the transparent substrate; and the color bar group is constituted by color bars of at least six colors of red, green, blue, a first color, a second color, and white arranged in a pattern in no particular order, coordinate points of the first color are within a region encompassed by the four points (0.351, 0.649), (0.547, 0.453), (0.380, 0.506) and (0.433, 0.464) on an xy chromaticity diagram; coordinate points of the second color are within a region encompassed by the four points (0.125, 0.489), (0.112, 0.229), (0.270, 0.407) and (0.224, 0.242) on an xy chromaticity diagram; and the peak wavelength of the transmission spectrum of the red color bar is 600 nm or more and 680 nm or less; the peak wavelength of the transmission spectrum of the green color bar is 495 nm or more and 570 nm or less; the peak wavelength of the transmission spectrum of the blue color bar is 430 nm or more and 490 nm or less; the peak wavelength of the transmission spectrum of the first color bar is 540 nm or more and 595 nm or less; and the peak wavelength of the transmission spectrum of the second color bar is 470 nm or more and 515 nm or less.

Incidentally, in the present specification, there may be some cases the color chart for color calibration in the present disclosure may be referred to as a color chart with broad color gamut or a color chart in the descriptions. Also, there may be some cases the first color is referred to as Ye and the second color is referred to as Cy in the descriptions.

Figure 12:
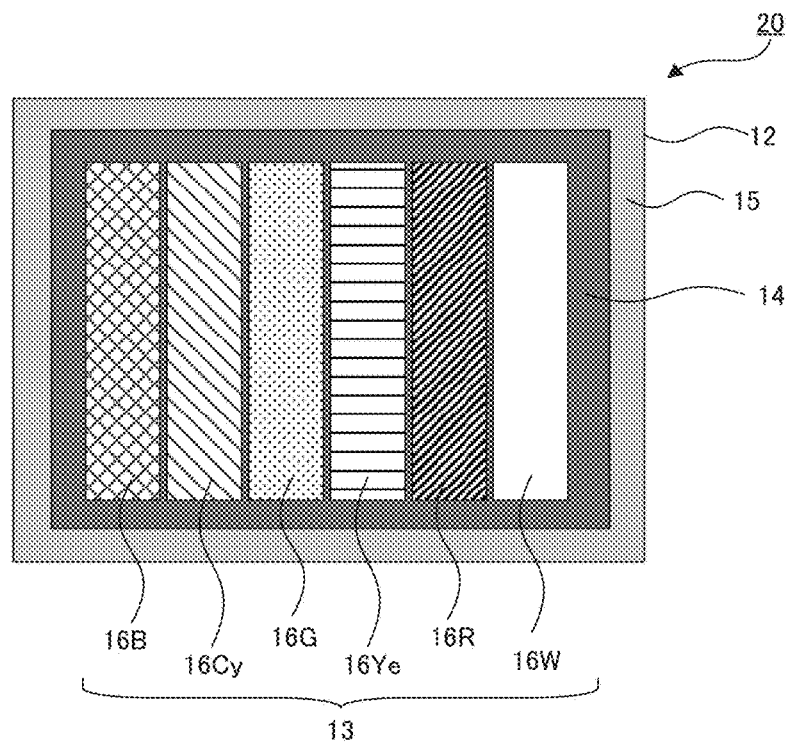
FIG. 12 is a schematic plan view showing an example of the color chart for color calibration.
Figure 13:
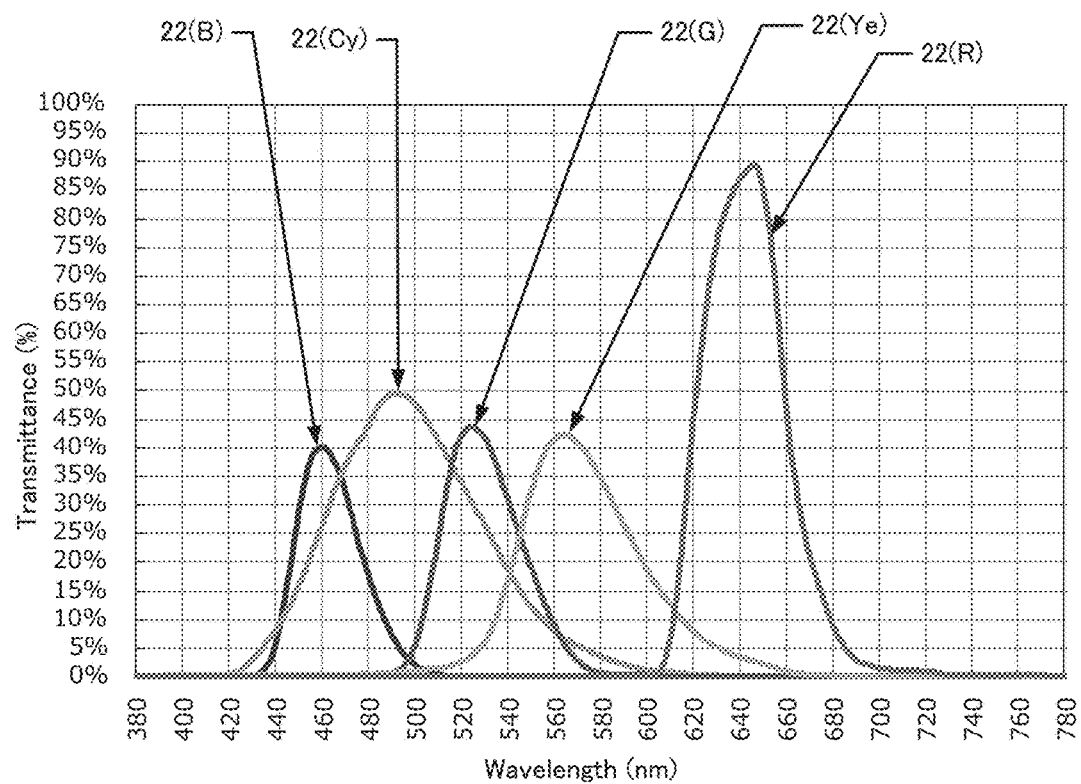
FIG. 13 is an image graph showing an example of a split transmission spectrum shown by the color calibration chart.
Figure 14:
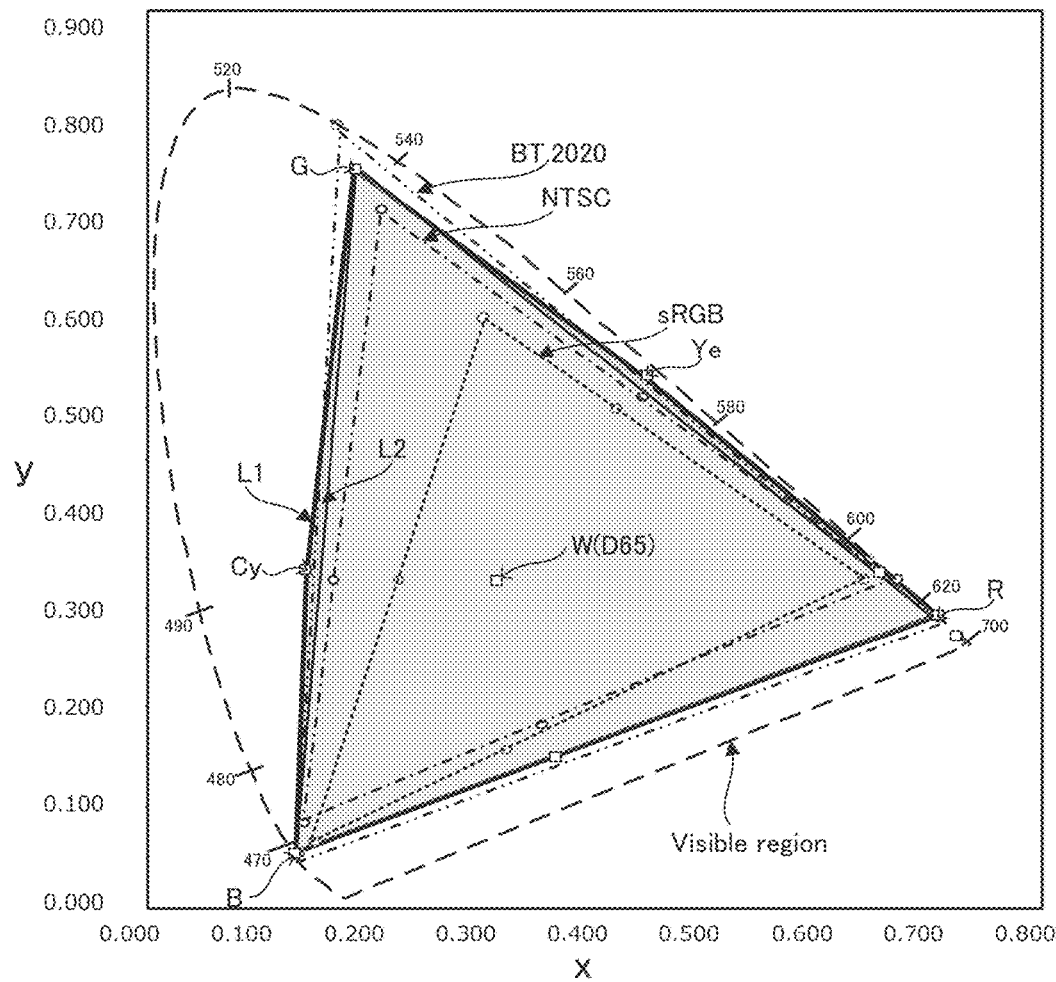
FIG. 14 is an xy chromaticity diagram showing an example of the color gamut of the color chart for color calibration.

The color chart in the present disclosure will be described with reference to the drawings. FIG. 12 is a schematic plan view showing an example of the color chart of this embodiment. In addition, FIG. 13 is an image graph showing an example of a split transmission spectrum indicated by the color chart of this embodiment, and FIG. 14 is an xy chromaticity diagram showing the color gamut of the color chart in the present disclosure.

A color chart 20 has a transparent substrate 12, and a color bar group 13 formed on the transparent substrate 12. A color bar holding frame 15 may be present at the outer periphery of the color bar group 13. The color bar group 13 comprises color bars of at least the six colors of a red color bar 16R, a green color bar 16G, a blue color bar 16B, a first color bar 16Ye, and a second color bar 16Cy and a white color bar 16W, arranged in a pattern in no particular order. The white color bar 16W is typically transparent. A light shielding part 14 may be provided at the perimeter of the various colors' color bars on the transparent substrate 12. The color chart 20 has split transmission spectrum properties such as shown in FIG. 13, and as shown in FIG. 14, has a color gamut L1 enclosed by a pentagon formed by connecting with straight lines the various coordinates of the five colors excluding W on the xy chromaticity diagram. Reference symbol L2 in FIG. 14 indicates a color gamut encompassed by a triangle formed by connecting with straight lines the various coordinates of the three colors of R, G and B on the xy chromaticity diagram. The same is true below.

The color chart is such that the light incident from the back surface is split in accordance with the selective transmittance of the color bars of the five colors excluding W that comprise the color bar group, and within the visible light region, the transmission spectra of the various colors respectively emerge in this order from the short wavelength side: the B color bar, the Cy (second) color bar, the G color bar, the Ye (first) color bar and the R color bar.

In the present disclosure, the transmission spectra of the colors bars of the various colors excluding W that constitute the color bar group are characterized in being positioned with good balance and having peaks with a desired spacing within the visible light region. That is to say, as shown in FIG. 13, the color chart is such that the peak wavelength of the transmission spectrum 22(R) of the R color bar is 600 nm or more and 680 nm or less, the peak wavelength of the transmission spectrum 22(G) of the G color bar is 495 nm or more and 570 nm or less, and the peak wavelength of the transmission spectrum 22(B) of the B color bar is 430 nm or more and 490 nm or less.

In addition, the peak wavelength of the transmission spectrum 22(Ye) of the Ye color bar is 540 nm or more and 595 nm or less, and the peak wavelength of the transmission spectrum 22(Cy) of the Cy color bar is 470 nm or more and 515 nm or less.

In addition, the chromaticity coordinates of the color bars of the five colors excluding W in the color chart are distributed as shown in FIG. 14 in the xy chromaticity diagram. The color chart can reproduce and calibrate the colors of the pointer colors contained within the color gamut L1 encompassed by a pentagon formed by connecting with straight lines the various coordinates of the five colors, on the above-described xy chromaticity diagram. The chromaticity coordinates of the color bars on the xy chromaticity diagram are coordinates that can be computed by $$X = \int(380 \text{ nm to } 780 \text{ nm})P(\lambda)*x\_(\lambda)*S\_(\lambda)d\lambda / \int(380 \text{ nm to } 780 \text{ nm})y\_(\lambda)*S\_(\lambda)d\lambda$$

$$Y = \int(380 \text{ nm to } 780 \text{ nm})P(\lambda)*y\_(\lambda)*S\_(\lambda)d\lambda / \int(380 \text{ nm to } 780 \text{ nm})y\_(\lambda)*S\_(\lambda)d\lambda$$

$$Z = \int(380 \text{ nm to } 780 \text{ nm})P(\lambda)*z\_(\lambda)*S\_(\lambda)d\lambda / \int(380 \text{ nm to } 780 \text{ nm})y\_(\lambda)*S\_(\lambda)d\lambda$$

$$x = X/(X+Y+Z)$$

$$y = Y/(X+Y+Z)$$

$$z = 1-x-y\_(=Z/(X+Y+Z)),$$

where is $P(\lambda)$ is the color-splitting spectrum of the color bar, $x\_(\lambda)$, $y\_(\lambda)$ and $z\_(\lambda)$ are the color matching functions in the XYZ color system adopted by CIE in 1931, and $S\_(\lambda)$ is the spectral distribution of the light source. The above equations are stipulated in JIS 28701.

In addition, here the spectral distribution $S\_(\lambda)$ of the light source is based on CIE standard light source D65. W (D65) in FIG. 14 are the white coordinates of D65, and the white indicated by the above-described white coordinates is called "the white of D65" in this Specification.

With the present invention, by having the color bars of the five colors excluding white have peak wavelengths of the transmission spectra at prescribed positions, it is possible to cover the colors within the visible light region through the required minimum of six colors in order to include the desired pointer colors in the xy chromaticity diagram, and it is possible to uniformly reproduce the colors within the visible light region. Through this, it is possible to accurately accomplish color calibration of the imaging device.

Below, various configurations of the color charts of the present disclosure are described.

1. Color Bar Group

The color bar group is formed on a transparent substrate. The color bar group comprises color bars of a plurality of colors including at least a first color and a second color, arranged in a pattern in no particular order. The color bar group in the present disclosure preferably comprises color bars of at least the six colors R, G, B, Ye, Cy and W, for example, arranged in a pattern in no particular order. The phrase "the five colors excluding (omitting) W" means the five colors of R, G, B, Ye and Cy. In this Specification, "color bars of the five colors" means the color bars of the aforementioned five colors unless stated otherwise. "Color bars of the six colors" means the color bars of the six colors in total, including the aforementioned five colors and W, unless stated otherwise. As described below, this is the same even when the color bars of other colors are included.

(1) Transmission Spectra

The transmission spectrum of the first color's color bar and the transmission spectrum of the second color's color bar have peak tops that are respectively separated, and can make mountain-shaped waveforms. In addition, typically the transmission spectra of the R, G and B color bars have peak tops that are respectively separated and can make mountain-shaped waveforms.

(a) Peak Wavelength Measurement Method

Figure 15A:
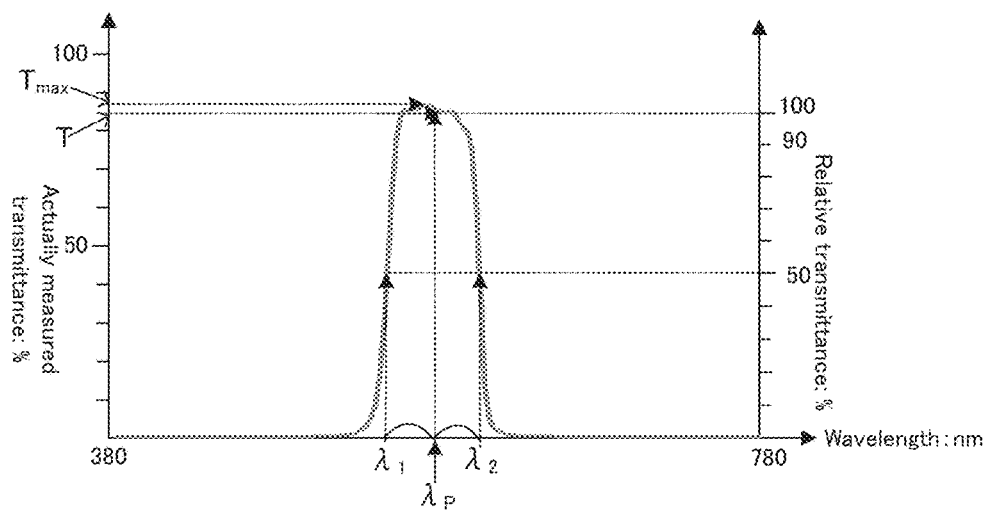
FIGS. 15A to 15C are explanatory diagrams explaining a method of stipulating the peak wavelengths and standard wavelengths of the transmission spectra.

The transmission spectra of the color bars of the five colors excluding W have peak wavelengths or standard wavelengths in accordance with the waveform. That is to say, the transmission spectra of the color bars of the five colors excluding W exhibit a mountain-shaped waveform as shown in FIG. 15A, and have a peak wavelength $\lambda_P$ exhibiting high transmittance. As shown in FIG. 15A, the maximum value $T_{max}$ of the measured transmittance of the transmission spectrum is specified, wavelengths $\lambda_1$ and $\lambda_2$ where the relative transmittance is 50% when the transmittance of the maximum value $T_{max}$ is 100% are specified, and the peak wavelength $\lambda_P$ is taken as the center wavelength of the wavelength region from the wavelength $\lambda_1$ to the wavelength $\lambda_2$. In addition, the measured transmittance T at the peak wavelength $\lambda_P$ is called the "transmittance at the peak wavelength (hereafter at times called the peak transmittance)."

When reference is made simply to "transmittance," this means measured transmittance, and when reference is made to "relative transmittance," this means the transmittance converted such that the measured transmittance at the specified wavelength is 100%.

The transmission spectra of the color bars of the various colors are obtained by measuring the transmittance in the visible light region of 380 nm-780 nm with the color bar of the white color that is colorless (transparent) as the background, using an Olympus OSP-SP200 microspectrometer. In addition, when calculating the coordinates of the various colors on the xy chromaticity diagram, the commonly known data of the D65 light source spectrum is used.

The same is true below even for color bars of arbitrary colors other than the aforementioned five colors.

(b) Spectrum Properties of Each Color's Color Bar

Below, the spectrum properties of the color bars of the various colors comprising the color bar group will be described.

(i) Red (R) Color Bar

The R color bar has selective transmittance for red light in the light source. The transmission spectrum of the R color bar preferably has peak tops that are separated. That is to say, the transmission spectrum of the R color bar preferably is a mountain-shaped waveform. This is because by making the brightness of the color bar group more uniform and further controlling the effects of the IR cut filter with which the camera of the imaging device is equipped, it becomes possible to accomplish accurate color calibration of the imaging device.

The peak wavelength of the transmission spectrum of the R color bar is preferably 600 nm or more and 680 nm or less, for example, and within this, 610 nm or more and 680 nm or less is preferable, and 625 nm or more and 680 nm or less is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the R color bar, 120 nm or less is preferable, and within this, 20 nm or more and 100 nm or less is preferable and 30 nm or more and 80 nm or less is particularly preferable. In addition, 10 nm can be set as the lower limit of the aforementioned half-width. This is because when the aforementioned half-width is not within the aforementioned range, there is also an overlap region with the transmission spectra of the color bars of the other colors, raising the possibility that it could be difficult to sufficiently broaden the red region of the color gamut of the color chart of this embodiment, and creating the fear that saturation of the reproducible colors could drop. The half-width of the transmission spectrum means the gap between the wavelengths that are half of the peak transmittance of the transmission spectrum, and can be calculated from the measurement results by measurement of the transmission spectrum discussed above (using an Olympus OSP-SP200microspectrometer). Below, the same is true for the color bars of the other colors as well.

In addition, the transmission spectrum of the R color bar is furthermore preferably the same as the transmission spectrum of red specified in the BT. 2020 standard. That is to say, preferably the peak wavelength of the transmission spectrum of the R color bar is 620 nm or more and 680 nm or less and the half-width is not greater than 100 nm, and more preferably the peak wavelength is 630 nm or more and 670 nm or less and the half-width is not greater than 80 nm, and still more preferably the peak wavelength is 630 nm or more and 660 nm or less and the half-width is not greater than 70 nm. This is because by having the peak wavelength and the half-width of the transmission spectrum of the aforementioned R color bar be within the aforementioned ranges, it is possible for the coordinates of the red color bar on the xy chromaticity diagram to match or be close to the coordinates of the color red stipulated in the BT. 2020 standard, and it is possible to broaden the red color region of the color gamut of the color chart of this embodiment to the red color region stipulated by the BT. 2020 standard.

(ii) Green (G) Color Bar

The G color bar has selective transmittance for green light in the light source. The transmission spectrum of the G color bar preferably has peak tops that are separated. That is to say, the transmission spectrum of the G color bar preferably is a mountain-shaped waveform. This is because by making the brightness of the color bar group more uniform and further controlling the effects of the IR cut filter with which the camera of the imaging device is equipped, it becomes possible to accomplish accurate color calibration of the imaging device.

The peak wavelength of the transmission spectrum of the G color bar is preferably 495 nm or more and 570 nm or less, for example, and within this, 505 nm or more and 550 nm or less is preferable, and 510 nm or more and 540 nm or less is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the G color bar, it is good if the transmission spectrum of the G color bar exhibits a waveform that can partially overlap with the transmission spectrum of the Cy color bar and the transmission spectrum of the Ye color bar. Specifically, the aforementioned half-width is preferably 100 nm or less, and within this, 20 nm or more and 80 nm or less is preferable and 30 nm or more and 60 nm or less is particularly preferable. In addition, 10 nm can be set as the lower limit of the aforementioned half-width.

This is because when the aforementioned half-width is not within the aforementioned range, there is also an overlap region with the transmission spectra of the color bars of the other colors, raising the possibility that it could be difficult to sufficiently broaden the green region of the color gamut of the color chart of this embodiment, and creating the fear that saturation of the reproducible colors could drop.

In addition, the transmission spectrum of the G color bar is preferably the same as the transmission spectrum of red specified in the BT. 2020 standard. That is to say, preferably the peak wavelength of the transmission spectrum of the G color bar is 510 nm or more and 540 nm or less and the half-width is not greater than 80 nm, and more preferably the peak wavelength is 515 nm or more and 538 nm or less and the half-width is not greater than 60 nm, and still more preferably the peak wavelength is 520 nm or more and 535 nm or less and the half-width is not greater than 40 nm. This is because by having the peak wavelength and the half-width of the transmission spectrum of the aforementioned G color bar be within the aforementioned ranges, it is possible for the coordinates of the G color bar on the xy chromaticity diagram match or be close to the coordinates of the color red stipulated in the BT. 2020 standard, and it is possible to broaden the green color region of the color gamut of the color chart of this embodiment to the green color region stipulated by the BT. 2020 standard.

(iii) Blue (B) Color Bar

The B color bar has selective transmittance for blue light in the light source. The transmission spectrum of the B color bar preferably has peak tops that are separated. That is to say, the transmission spectrum of the B color bar preferably is a mountain-shaped waveform. This is because by making the brightness of the color bar group more uniform and further controlling the effects of the IR cut filter with which the camera of the imaging device is equipped, it becomes possible to accomplish accurate color calibration of the imaging device.

The peak wavelength of the transmission spectrum of the B color bar is preferably 430 nm or more and 490 nm or less, for example, and within this, 435 nm or more and 475 nm or less is preferable, and 450 nm or more and 470 nm or less is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the B color bar, it is good if the transmission spectrum of the B color bar exhibits a waveform that can partially overlap with the transmission spectrum of the Cy color bar. Specifically, the aforementioned half-width is preferably 100 nm or less, and within this, 20 nm or more and 85 nm or less is preferable and 25 nm or more and 55 nm or less is particularly preferable. In addition, 10 nm can be set as the lower limit of the aforementioned half-width. This is because when the aforementioned half-width is not within the aforementioned range, there is also an overlap region with the transmission spectra of the color bars of the other colors, raising the possibility that it could be difficult to sufficiently broaden the blue region of the color gamut of the color chart of this embodiment, and creating the fear that saturation of the reproducible colors could drop.

In addition, the transmission spectrum of the B color bar is preferably the same as the transmission spectrum of red specified in the BT. 2020 standard. That is to say, preferably the peak wavelength of the transmission spectrum of the B color bar is 450 nm or more and 472 nm or less and the half-width is not greater than 80 nm, and more preferably the peak wavelength is 455 nm or more and 470 nm or less and the half-width is not greater than 60 nm, and still more preferably the peak wavelength is 458 nm or more and 468 nm or less and the half-width is not greater than 40 nm. This is because by having the peak wavelength and the half-width of the transmission spectrum of the aforementioned B color bar be within the aforementioned ranges, it is possible for the coordinates of the R color bar on the xy chromaticity diagram match or be close to the coordinates of the color blue stipulated in the BT. 2020 standard, and it is possible to broaden the blue color region of the color gamut of the color chart of this embodiment to the blue color region stipulated by the BT. 2020 standard.

(iv) First Color's Color Bar

The first color's color bar in this embodiment is such that the coordinate points on the xy chromaticity diagram are within the region encompassed by the four points (0.351, 0.649), (0.547, 0.453), (0.380, 0.506) and (0.433, 0.464), but within this, within the region encompassed by the four points (0.417, 0.583), (0.490, 0.510), (0.387, 0.501) and (0.421, 0.474) is preferable, and within the region encompassed by the four points (0.435, 0.565), (0.472, 0.528), (0.402, 0.504) and (0.421, 0.489) is particularly preferable.

In addition, the transmission spectrum of the first color's color bar has peak tops that are separated. That is to say, the transmission spectrum of the first color's color bar has a mountain-shaped waveform. Through this, it is possible to accomplish accurate color calibration of the imaging device, by making the brightness of the color bar group uniform and by further controlling the effects of the IR cut filter with which the camera of the imaging device is equipped.

Incidentally, there are cases in which the first color's color bar is called the Ye color bar.

The Ye color bar has selective transmittance for short-wavelength light and long-wavelength light in the light source. In addition, the transmission spectrum of the Ye color bar is positioned between the transmission spectrum of the G color bar and the transmission spectrum of the R color bar.

The peak wavelength of the transmission spectrum of the Ye color bar may be 540 nm or more and 595 nm or less, and within this, 545 nm or more and 585 nm or less is preferable, and 560 or more and 575 nm or less is particularly preferable. This is because when the aforementioned peak wavelength is not within the aforementioned range, when the transmission spectra of the five colors excluding W are positioned with good balance, separation of the peak tops is not clear and the interpolation color effect does not readily emerge.

In addition, as the half-width of the transmission spectrum of the Ye color bar, it is good if the transmission spectrum of the Ye color bar can exhibit a waveform that can partially overlap with the transmission spectrum of the G color bar. Specifically, the aforementioned half-width is preferably 180 nm or less, and within this, 20 nm or more and 170 nm or less is preferable and 30 nm or more and 70 nm or less is particularly preferable. In addition, 10 nm can be set as the lower limit of the aforementioned half-width. This is because when the aforementioned half-width is not within the aforementioned range, the overlap region with the transmission spectra of the color bars of the other colors increases.

(v) Second Color's Color Bar

The second color's color bar in this embodiment has coordinate points on the xy chromaticity diagram are within the region encompassed by the four points (0.125, 0.489), (0.112, 0.229), (0.270, 0.407) and (0.224, 0.242), but within this, within the region encompassed by the four points (0.123, 0.437), (0.115, 0.296), (0.254, 0.350) and (0.240, 0.297) is preferable, and within the region encompassed by the four points (0.133, 0.384), (0.130, 0.320), (0.239, 0.341) and (0.231, 0.312) is particularly preferable.

In addition, the transmission spectrum of the second color's color bar has peak tops that are separated. That is to say, the transmission spectrum of the second color's color bar has a mountain-shaped waveform. Through this, it is possible to accomplish accurate color calibration of the imaging device, by making the brightness of the color bar group uniform and by further controlling the effects of the IR cut filter with which the camera of the imaging device is equipped.

Below, there are cases in which the second color's color bar is called the Cy color bar in the present Specification.

The Cy color bar has selective transmittance for short-wavelength light and intermediate-wavelength light in the light source. In addition, the transmission spectrum of the Cy color bar is positioned between the transmission spectrum of the G color bar and the transmission spectrum of the B color bar.

The peak wavelength of the transmission spectrum of the Cy color bar may be 470 nm or more and 515 nm or less, and within this, 480 nm or more and 505 nm or less is preferable, and 490 nm or more and 500 nm or less is particularly preferable. This is because when the aforementioned peak wavelength of the transmission spectrum of the aforementioned Cy color bar is not within the aforementioned range, when the transmission spectra of the five colors excluding W are positioned with good balance, separation of the peak tops is not clear and the interpolation color effect does not readily emerge.

As the half-width of the transmission spectrum of the Cy color bar, it is good if the transmission spectrum of the Cy color bar can exhibit a waveform that can partially overlap the transmission spectrum of the G color bar and the transmission spectrum of the B color bar. Specifically, the aforementioned half-width is preferably 150 nm or less, and within this, 20 nm or more and 130 nm or less is preferable and 30 nm or more and 80 nm or less is particularly preferable. In addition, 10 nm can be set as the lower limit of the aforementioned half-width. This is because when the aforementioned half-width is not within the aforementioned range, the overlap region with the transmission spectra of the color bars of the other colors increases, and in particular, even if the B and G are different hues on the color coordinates in the xy chromaticity diagram, spectrum separation on the split transmission spectrum becomes difficult.

(vi) White (W) Color Bar

The W color bar is colorless and has transmittance, and is used as a blank. The W color bar can be made the below-described transparent substrate. In addition, in order to enable brightness regulation, a colorless W color bar (for example, an ND filter or the like) designed so that light in the range visible to the eye can be uniformly absorbed may be positioned on the transparent substrate, and may also be used as the transparent substrate.

(vii) Arbitrary Color Bars

The aforementioned color bar group preferably further includes color bars of the two colors violet (V) and near infrared (NIR) having prescribed transmission spectra, in addition to the color bars of the six colors discussed above. By including the V color bar and the NIR color bar exhibiting prescribed transmission spectra in addition to the color bars of the five colors excluding W, it is possible for the color chart to sufficiently cover the colors within the visible light region and to uniformly reproduce the colors within the visible light region. Through this, it is possible to increase the precision of color calibration in imaging devices that use the color chart.

In addition, the aforementioned color bar group preferably further includes an orange (O) color bar having a prescribed transmission spectrum, in addition to the color bars of the six colors discussed above. By further including the O color bar exhibiting the prescribed transmission spectrum, the color chart can compensate for intermediate colors between yellow and red that have a wide gap between peak wavelengths, and can sufficiently cover the colors within the visible light region with good balance, making more detailed and higher precision color calibration possible.

The aforementioned color bar group may comprise a total of eight colors including the color bars of the six colors discussed above and the two colors of the V color bar and the NIR color bar having prescribed transmission spectra, or may comprise a total of seven colors including the color bars of the six colors discussed above and the O color bar. Furthermore, the color bar group may comprise a total of nine colors including the color bars of the six colors discussed above and a total of three colors including the V color bar and the NIR color bar along with the O color bar.

Below, the color bar of each color that can be included in the color chart will be described.

(Violet (V) Color Bar)

The transmission spectrum of the V color bar has selective transmittance for light on the shorter wavelength side than blue light out of the short-wavelength light in the light source, and consequently is preferably positioned to the short wavelength side of the transmission spectrum of the B color bar, with a portion overlapping the transmission spectrum of the B color bar.

Figure 15B:
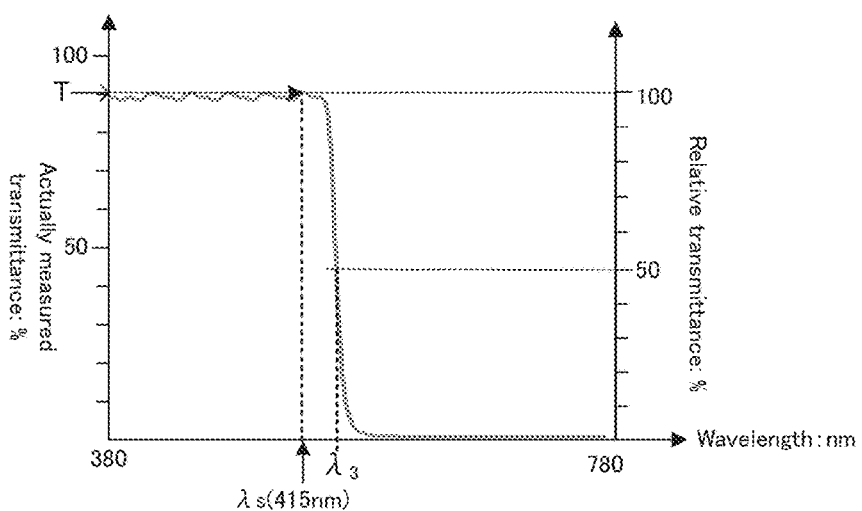

The transmission spectrum of the V color bar, besides having the mountain-shaped waveform shown in FIG. 16, in some cases has a waveform showing a transmittance at least as great as a prescribed transmittance at a given wavelength or less, as shown in FIG. 15B, and does not have a mountain-shaped waveform. Consequently, for the transmission spectrum of the V color bar, a wavelength of 415 nm is taken as the standard wavelength $\lambda_s$ and the measured transmittance T at the standard wavelength $\lambda_s$ is taken to be the "transmittance at the standard wavelength (below, there are times when this is referred to as the standard transmittance)," as shown in FIG. 15B. The transmission spectrum of the V color bar is preferably such that taking 415 nm as the standard wavelength $\lambda_s$, the wavelength (relative wavelength) $\lambda_3$ at which the relative transmittance is 50%, when the transmittance at the standard wavelength $\lambda_s$ is taken to be 100%, is 435 nm or more and 465 nm or less, and within this, 435 m or more and 460 nm or less is preferable, and 440 nm or more and 455 nm or less is particularly preferable. Assuming that the relative wavelength is within the aforementioned range, it is possible to suppress spreading of the waveform of the spectrum in the region of wavelengths longer than the standard wavelength, and to overlap with the transmission spectrum of the B color bar in a desired wavelength range. Through this, the transmission spectrum of the V color bar is such that overlapping of the peak itself can be maintained even while maintaining separation of the peak tops and the transmission spectrum of the B color bar, so it is possible to evaluate the short wavelength side of the visible light region without omissions.

In the region of wavelengths shorter than the aforementioned standard wavelength in the transmission spectrum of the V color bar, it is preferable to exhibit transmittance of at least a prescribed value. The "region of wavelengths shorter than the standard wavelength" means a wavelength region of at least the wavelength of 380 nm that is the lower limit of the visible light region and smaller than the standard wavelength of 415 nm. The transmission spectrum of the V color bar showing a transmittance of at least a prescribed value in the region of wavelengths shorter than the standard wavelength is preferably such that specifically when the standard transmittance is taken as 100%, the relative transmittance in the region of wavelengths shorter than the standard region is at least 5%, and more preferably at least 8%, and still more preferably at least 10%. This is because reproduction of colors in the region of wavelengths shorter than the standard wavelength of the transmission spectrum of the V color bar becomes possible.

The transmission spectrum of the V color bar is preferably such that the relative transmittance at wavelengths of 490 nm or greater is not greater than 5%, when the standard transmittance is taken to be 100%, and within this, not greater than 3% is preferable and not greater than 1% is particularly preferable. This is because when the relative transmittance in the above-described wavelength region of the transmission spectrum of the V color bar exceeds the above-described range, spectrum separation from the transmission spectra of the color bars of the other colors on the split transmission spectrum becomes difficult, and there is a high possibility that the reproducibility with respect to color coordinates on the xy chromaticity diagram will become extremely small.

(Near Infrared (NIR) Color Bar)

The transmission spectrum of the NIR color bar has selective transmittance for light on the longer wavelength side than red light out of the long-wavelength light in the light source, and consequently is preferably positioned to the short wavelength side of the transmission spectrum of the R color bar, with a portion overlapping the transmission spectrum of the B color bar.

Figure 15C:
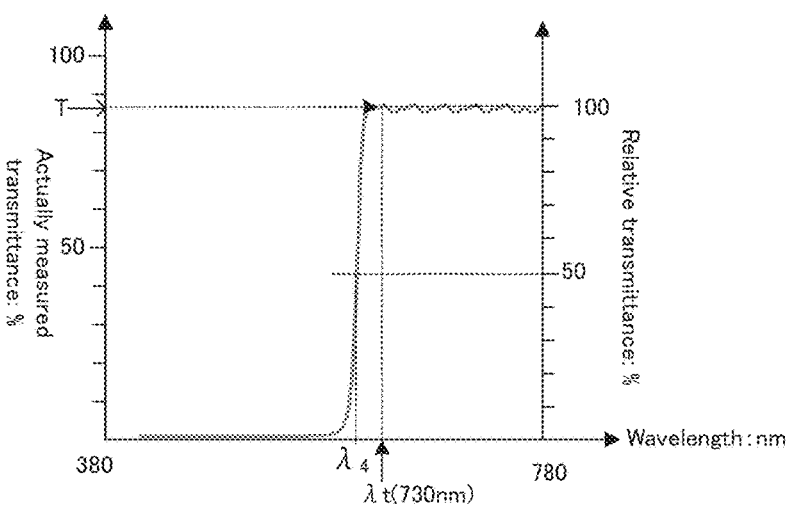

The transmission spectrum of the NIR color bar in some cases has a waveform showing a transmittance at least as great as a prescribed transmittance, at a given wavelength or greater, as shown in FIG. 15C, and does not have a mountain-shaped waveform. Consequently, for the transmission spectrum of the NIR color bar, a wavelength of 730 nm is taken as the standard wavelength $\lambda_t$ and the measured transmittance T at the standard wavelength $\lambda_t$ is taken to be the "transmittance at the standard wavelength (below, there are times when this is referred to as the standard transmittance)," as shown in FIG. 15C. The transmission spectrum of the NIR color bar is preferably such that taking 730 nm as the standard wavelength $\lambda_t$, the wavelength (relative wavelength) $\lambda_4$ at which the relative transmittance is 50%, when the transmittance at the standard wavelength $\lambda_t$ is taken to be 100%, is 630 nm or more and 730 nm or less, and within this, 640 m or more and 710 nm or less is preferable, and 650 nm or more and 700 nm or less is particularly preferable. Assuming that the relative wavelength is within the aforementioned range, it is possible to suppress spreading of the waveform of the spectrum in the region of wavelengths longer than the standard wavelength, and to overlap the transmission spectrum of the R color bar in a desired wavelength range. Through this, the transmission spectrum of the NIR color bar is such that overlapping of the peak itself can be maintained even while maintaining separation of the peak tops and the transmission spectrum of the R color bar, so it is possible to evaluate the long wavelength side of the visible light region without omissions.

In addition, in the region of wavelengths longer than the aforementioned standard wavelength in the transmission spectrum of the NIR color bar, it is preferable to exhibit transmittance of at least a constant value. The "region of wavelengths longer than the standard wavelength" means a wavelength region greater than the 730 nm that is the standard wavelength, and not greater than the wavelength of 780 nm that is the upper limit of the visible light region. The transmission spectrum of the NIR color bar showing a transmittance of at least a constant value in the region of wavelengths longer than the standard wavelength is preferably such that specifically when the standard transmittance is taken as 100%, the relative transmittance in the region of wavelengths longer than the standard region is at least 30%, and more preferably at least 50%, and still more preferably at least 80%. This is because reproduction of colors in the region of wavelengths longer than the standard wavelength of the transmission spectrum of the NIR color bar becomes possible.

The transmission spectrum of the NIR color bar is preferably such that the relative transmittance at wavelengths of 620 nm or less is not greater than 5%, when the standard transmittance is taken to be 100%, and within this, not greater than 2% is preferable and not greater than 1% is particularly preferable. This is because when the relative transmittance in the above-described wavelength region of the transmission spectrum of the NIR color bar exceeds the above-described range, spectrum separation from the transmission spectra of the color bars of the other colors on the split transmission spectrum becomes difficult, and there is a high possibility that the reproducibility with respect to color coordinates on the xy chromaticity diagram will become extremely small.

(Orange (O) Color Bar)

The transmission spectrum of the O color bar has selective transmittance for light on the shorter wavelength side than red light out of the long-wavelength light in the light source, and consequently is preferably positioned between the transmission spectrum of the Ye color bar and the transmission of the R color bar. Because the peak wavelength space between the transmission spectrum of the Ye color bar and the transmission spectrum of the R color bar is wide, by positioning the peak wavelength of the transmission spectrum of the O color bar in the aforementioned position, it is possible to compensate for the intermediate colors between Ye and R and it becomes possible to reproduce the aforementioned intermediate colors.

The peak wavelength of the transmission spectrum of the O color bar is preferably 575 nm or more and 620 nm or less, and within this, 580 nm or more and 615 nm or less is preferable, and 585 nm or more and 610 nm or less is particularly preferable. This is because when the aforementioned peak wavelength is not within the aforementioned range, when the transmission spectra of the eight colors excluding W are positioned with good balance, separation of the peak tops is not clear and the interpolation color effect does not readily emerge.

As the half-width of the transmission spectrum of the O color bar, it is good if the transmission spectrum of the O color bar can exhibit a waveform that can partially overlap the transmission spectrum of the Ye color bar and the transmission spectrum of the R color bar. Specifically, the aforementioned half-width is preferably 120 nm or less, and within this, 20 nm or more and 100 nm or less is preferable and 20 nm or more and 70 nm or less is particularly preferable. In addition, 10 nm can be set as the lower limit of the aforementioned half-width. This is because when the aforementioned half-width is not within the aforementioned range, the overlap region with the transmission spectra of the color bars of the other colors increases, and in particular, even if the Ye, R and NIR are different hues on the color coordinates in the xy chromaticity diagram, spectrum separation on the split transmission spectrum becomes difficult.

The transmission spectrum of the O color bar is preferably such that the relative transmittance at wavelengths of 550 nm or less and 680 nm or greater is not greater than 10%, when the peak transmittance is taken to be 100%, and within this, not greater than 5% is preferable and not greater than 3% is particularly preferable. This is because when the relative transmittance in the above-described wavelength region of the transmission spectrum of the O color bar exceeds the above-described range, the overlap region with the transmission spectra of the color bars of the other colors increases, and there is a possibility that spectrum separation on the split transmission spectrum will become difficult. In addition, this is because the color reproduction precision of O by the color chart decreases.

(Magenta (Mg) Color Bar)

The aforementioned color bar group preferably includes a magenta (Mg) color bar. In the xy chromaticity diagram based on the color chart, it is possible to specify the position of the W coordinates from the positional relationship between the R coordinates and the Cy coordinates, and the positional relationship between the B coordinates and the Ye coordinates, but by further taking into consideration the positional relationship between the G coordinates and the Mg coordinates, it is possible to more accurately specify the position of the W coordinates of D65, which is the standard color.

The Mg color bar has selective transmittance for red light and blue light in the light source. As shown in FIG. 17, the transmission spectrum 22(Mg) of the Mg color bar preferably has a first transmission peak (hereafter called the first peak wavelength) close to the peak wavelength of the transmission spectrum 22(R) of the R color bar, and a second transmission peak (hereafter called the second peak wavelength) close to the peak wavelength of the transmission spectrum 22(B) of the B color bar.

The transmission spectrum of the Mg color bar is such that the first peak wavelength is preferably 567 nm or more and 780 or less, and within this, 590 nm or more and 710 nm or less is preferable and 610 nm or more and 680 nm or less is particularly preferable. In addition, the second peak wavelength is preferably 380 nm or more and 495 nm or less, and within this, 400 nm or more and 485 nm or less is preferable and 430 nm or more and 470 nm or less is particularly preferable. This is because when the peak wavelengths of the transmission spectrum of the Mg color bar are not within the aforementioned ranges, when reproducing white by mixing magenta and green, which have a complementary color relationship, it is difficult to obtain white that is D65 with any mixture ratio. In addition, this is because bringing in the specified color coordinates on the xy chromaticity diagram becomes difficult without the half-width of the transmission spectrum of the Mg color bar.

(Other)

In the split transmission spectra of the color chart, by having neighboring transmission spectra partially overlap in the visible light region, it is possible to accurately specify the mixture ratio of the various color components included in the mixed color, and it is possible to improve the color reproduction precision and the color calibration precision of the mixed colors.

(2) Xy Chromaticity Diagram

Next, the xy chromaticity diagram shown by the color chart through the aforementioned color bar group will be described. The color chart is such that the chromaticity coordinates of the color bars of the five colors excluding W are distributed as shown in FIG. 14 on the xy chromaticity diagram. As the various coordinates (x,y) of R, G, B, Ye and Cy on the xy chromaticity diagram shown in FIG. 14, it is possible to have, for example, R (0.708, 0.291), G (0.187, 0.751), B (0.137, 0.049), Ye (0.448, 0.538), and Cy (0.141, 0.339).

The color chart can reproduce and calibrate the pointer colors included within the color gamut enclosed by a pentagon formed by connecting with straight lines the various coordinates of the five colors. It is possible to have a color gamut broader than a conventional color chart, because the various color bars comprising the color bar group exhibit the transmission spectra discussed above.

The inclusion rate of pointer colors included within the pentagon formed by connecting with straight lines the coordinates on the xy chromaticity diagram of the aforementioned color bars of the five colors excluding white is for example preferably 90.3% or greater, and within this, 99.9% or greater is preferable, and 100%, that is to say including all of the pointer colors within the aforementioned pentagon, is more preferable. By the pentagon formed by connecting with straight lines the coordinates of the five colors excluding white becoming the color gamut of the color chart and the aforementioned color gamut sufficiently including the pointer colors, it is possible to sufficiently cover the colors within the visible light region. Through this, it is possible to more accurately reproduce the object colors that actually exist, so it becomes possible to accomplish color calibration of the imaging device with high precision.

Figure 18:
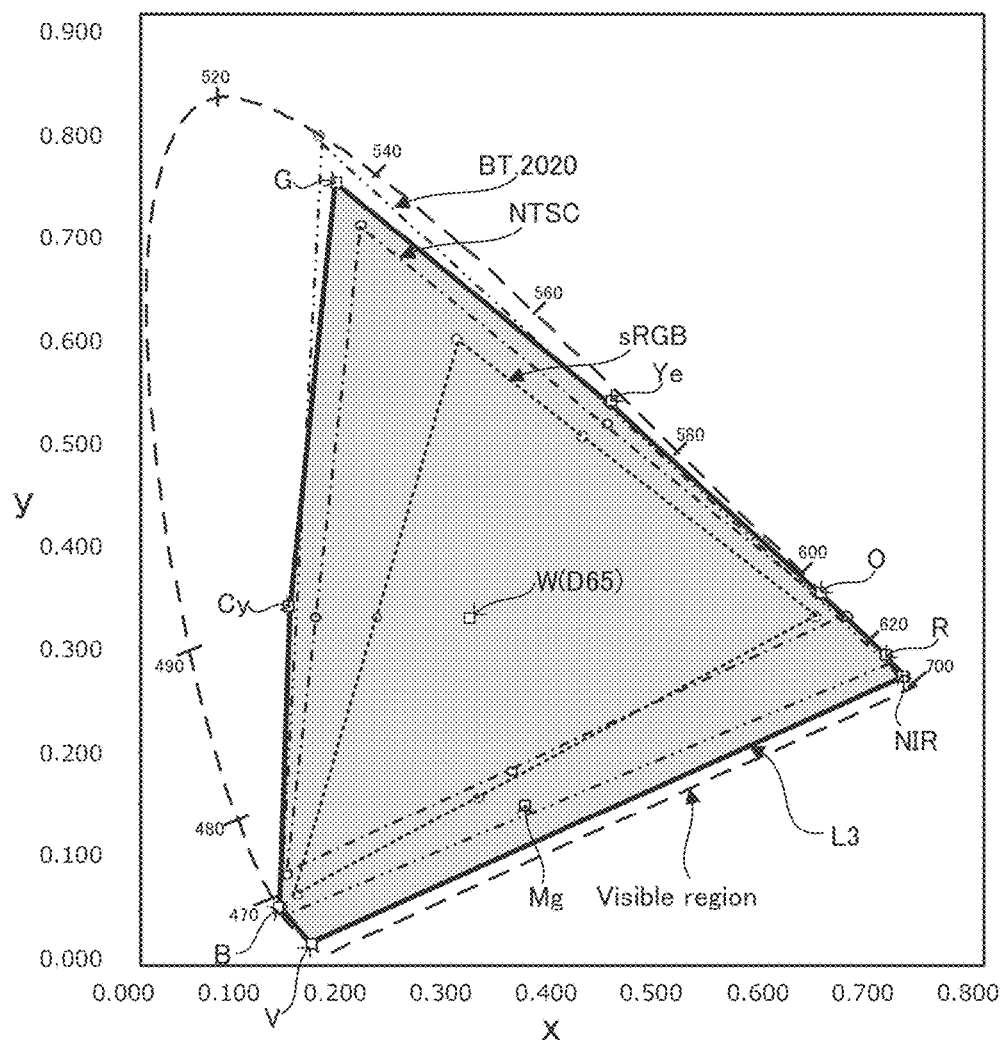
FIG. 18 is an xy chromaticity diagram showing another example of the color gamut of the color chart for color calibration.

When the color chart includes the V color bar, the NIR color bar and the O color bar in the aforementioned color bar group, the chromaticity coordinates of the color bars of the eight colors excluding W are distributed as shown in FIG. 18 on the xy chromaticity diagram. The coordinates (x,y) of the V, NIR and O on the xy chromaticity diagram shown in FIG. 18 can be, for example, V (0.164, 0.013), NIR (0.724, 0.272) and O (0.647, 0.352).

The color chart can expand the range of the color gamut on the xy chromaticity diagram in accordance with the number of colors included in the aforementioned color bar group. For example, when the aforementioned color bar group comprises a total of eight colors further including the V color bar and the NIR color bar in addition to the color bars of the six colors, the color chart can reproduce and calibrate the pointer colors included within the color gamut enclosed by the heptagon formed by connecting with straight lines the coordinates of the seven colors excluding W, on the xy chromaticity diagram. In addition, when the aforementioned color bar group comprises a total of seven colors further including the O color bar in addition to the color bars of the six colors, the color chart can reproduce and calibrate the pointer colors included within the color gamut enclosed by the hexagon formed by connecting with straight lines the coordinates of the six excluding W, on the xy chromaticity diagram. Furthermore, when the aforementioned color bar group comprises a total of nine colors further including the V color bar, the NIR color bar and the O color bar in addition to the color bars of the six colors, the color chart of this embodiment can reproduce and calibrate the pointer colors included within the color gamut enclosed by the octagon formed by connecting with straight lines the coordinates of the eight colors excluding W, on the xy chromaticity diagram. In this manner, it is possible to have a broader color gamut, by increasing the types of colors of color bars comprising the color bar group. When the color bar group is composed of the seven colors, eight color or nine colors discussed above, the inclusion rate of the pointer colors included within the polygon formed by connecting with straight lines the coordinates on the xy chromaticity diagram can be the same as the inclusion rate of the pointer colors included in the pentagon made by the color bars of the five colors.

As discussed above, in the split transmission spectrum of the color chart, the peak wavelengths and half-widths of the transmission spectra of the various color bars of R, G and B are preferably within prescribed ranges. This is because the color gamut (L2 in FIG. 14) of the color chart specified by the triangle formed by connecting with straight lines the coordinates of the three primary colors on the xy chromaticity diagram can approach the color gamut specified by the coordinates of the three primary colors in the BT. 2020 standard, and it becomes possible to handle color calibration of imaging devices to which the BT.2020 standard is applied. In addition, it is possible to cause the waveforms of the transmission spectra to have various waveform shapes with respect to the various color coordinates, so the color chart can maintain the color reproducibility through the transmission spectrum, by setting the half-widths in conjunction with the positions of the peak wavelengths of the transmission spectra for each of the colors.

Figure 19:
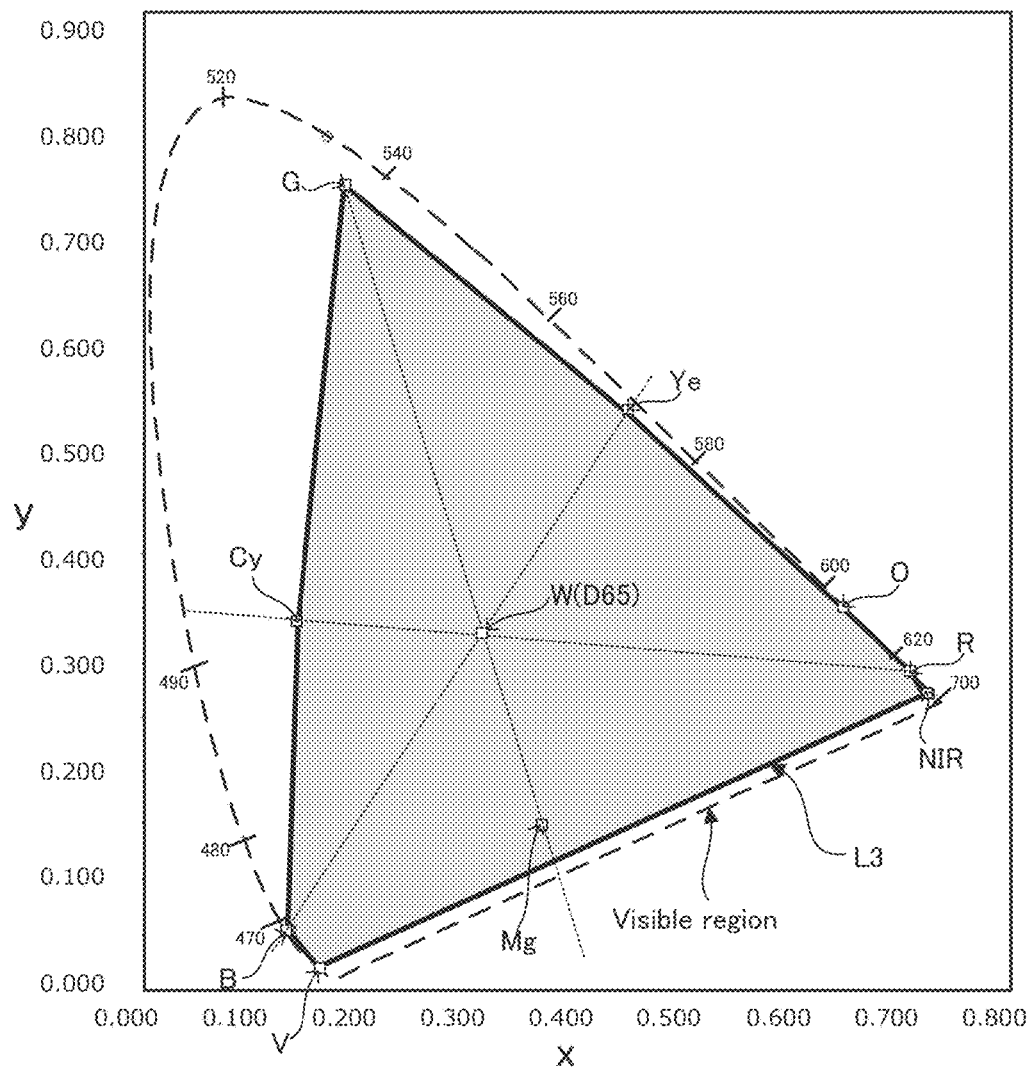
FIG. 19 is an xy chromaticity diagram explaining the positions of the chromaticity coordinates of Cy, Ye and Mg in the color gamut of the color chart for color calibration.

As shown in FIG. 19, preferably the coordinates on the xy chromaticity diagram of the Cy color bar (hereafter called the Cy coordinates) are on an extension of the line connecting the coordinates on the xy chromaticity diagram of the aforementioned R color bar (R coordinates) and the W (65) coordinates, and are positioned on the outer periphery of the color gamut specified by the BT. 2020 standard or on the outside of the aforementioned color gamut, and the coordinates on the xy chromaticity diagram of the aforementioned Ye color bar (hereafter called the Ye coordinates) are on an extension of the line connecting the coordinates on the xy chromaticity diagram of the aforementioned B color bar (B coordinates) and the W (65) coordinates, and are positioned on the outer periphery of the color gamut specified by the BT. 2020 standard or on the outside of the aforementioned color gamut. By having the position of the Cy coordinates be on an extension of the line connecting the W (D65) coordinates and the R coordinates and having the position of the Ye coordinates be on an extension of the line connecting the W (D65) coordinates and the B coordinates on the xy chromaticity diagram, it is possible to reproduce white that is the D65 by mixing in a suitable ratio combinations of cyan and red, which have a complementary color relationship, or yellow and blue, and high-precision adjustment of the white balance becomes possible. In addition, the positions of the Cy coordinates and the Ye coordinates may be on the outer periphery of the color gamut provided by the BT. 2020 standard or may be positioned to the outside of the aforementioned color gamut, and through this it is possible to broaden the color gamut where color reproduction is possible using the color chart of this embodiment.

In this, the Cy coordinates are preferably at the intersection of a side of the aforementioned triangle and an extension of the line connecting the R coordinates and the W coordinates, and the Ye coordinates are preferably at the intersection of a side of the aforementioned triangle and an extension of the line connecting the B coordinates and the W coordinates. When the Cy coordinates are on the aforementioned triangle on the xy chromaticity diagram, it is possible to verify that the cyan obtained by mixing green and blue in a suitable mixing ratio and the cyan indicated by the Cy color bar of the color chart of this embodiment are the same, and it is possible to verify that the white obtained by mixing cyan and red is the white of D65. In addition, similarly with regard to Ye, when the Ye coordinates are on the aforementioned triangle on the xy chromaticity diagram, it is possible to verify that the yellow obtained by mixing green and red in a suitable mixing ratio and the yellow indicated by the Ye color bar of the color chart are the same, and it is possible to verify that the white obtained by mixing yellow and blue is the white of D65. Thus, the color chart is such that by having the Cy coordinates and the Ye coordinates on the xy chromaticity diagram in the aforementioned positions, it is possible to calibrate the same white obtained by respectively mixing cyan and red, and yellow and blue, to the white of D65.

Furthermore, when the aforementioned color bar group includes the Mg color bar, the coordinates of the Mg color bar on the xy chromaticity diagram (hereafter called the Mg coordinates) are preferably on an extension of the line connecting the coordinates of the aforementioned G color bar on the xy chromaticity diagram (G coordinates) and the aforementioned W coordinates, and in this, it is preferable that this be on the aforementioned extension and on a side of the aforementioned triangle. By having the position of the Mg coordinates be on an extension of the line connecting the W (D65) coordinates and the G coordinates on the xy chromaticity diagram, it is possible to reproduce white that is D65 by mixing in a suitable ratio respective combinations of the red and cyan, blue and yellow, and green and magenta, which have complementary color relationships. This is because through this, the color chart of this embodiment can more accurately accomplish calibration of white and adjustment of the white balance. When the Mg color bar is included, the Mg coordinates are not included as the coordinates of each color stipulating the color gamut.

The transmission spectra of the color bars of each of the colors Cy, Ye and Mg are such that the positions of the peak wavelengths and the half-widths can be appropriately adjusted and designed in accordance with the positions of the coordinates of Cy, Ye and Mg on the xy chromaticity diagram. The transmission spectrum of the Cy color bar is such that in order to adjust the coordinates of Cy, it is possible to set as a guide for the peak position the location where the extension of the line drawn to the color coordinates of Cy as a target from the color coordinates position of W (D65) and the wavelength position along the outer periphery curve of the xy chromaticity diagram intersect. In addition, the half-width of the transmission spectrum of the Cy color bar can be set so as to not interfere with the peak positions of other adjacent transmission spectra. Because the saturation increases the smaller the aforementioned half-width is and the saturation diminishes the larger this is, it is possible to change the half-width in accordance with the coordinate position that is the target for Cy. The same is also true for the transmission spectrum of the Ye color bar. In addition, with regard to Mg, it is possible to set the first peak and the second peak of the transmission spectrum of the Mg color bar to the peak wavelength position of the B color bar or the V color bar and the peak wavelength position of the R color bar or the NIR color bar, respectively, where it is possible to draw a straight line passing through the Mg coordinates that are the target on the xy chromaticity diagram. The half-width of the transmission spectrum of the Mg color bar can be changed in accordance with the coordinate position that is the target for Mg.

(3) Structure of the Color Bars and Color Bar Group

The color bar of each color may be a member showing the desired transmission spectrum, and for example a band pass filter or a dye substrate can be used. The dye substrate can be formed through a dyeing method, and for example can be formed using a silver salt emulsion prepared by adding potassium bromide to a gelatin solution of silver nitrate, by applying the aforementioned silver salt solution to a chip substrate such as a glass plate or the like, then drying and removing the silver from the silver salt photographic dry plate, and dyeing with a dye in accordance with the color of the color bar. In addition, the dye substrate can also be formed by mixing dye in advance in a gelatin (solution) and applying the material that has been made the desired color to a chip substrate such as a glass plate or the like.

When forming the color bar of each of the colors, the peak wavelength position of the transmission spectrum of the color bar can be regulated in accordance with the type of color bar and the formation method thereof. For example, when the dye substrate using one type of dye is used as the color bar, it is possible to adjust the peak wavelength of the transmission spectrum of the color by adjusting the density of the dye. In addition, when a dye substrate formed by combining two or more types of dye is used as the color bar, it is possible to adjust the peak wavelength of the transmission spectrum of the color bar by changing the mixing ratio of the two dyes. Specifically, if this is a G color bar, it is possible to form this through a dyeing method using the two types of yellow dye and blue dye, but it is possible to adjust the peak wavelength position by increasing the mixing ratio of the yellow dye when causing the peak wavelength to shift to the long wavelength side, and by increasing the mixing ratio of the blue dye when causing a shift to the short wavelength side.

The size or the like of the color bars is not particularly limited, and it is possible to appropriately design this so that the desired effect is easily attained in accordance with the application or the like of the color chart.

In the color bar group, the color bars of the various colors are arranged in a pattern in no particular order. As the arrangement pattern of the color bars of the various colors, arrangement in a single row in the linear pattern illustrated in FIG. 12 is fine, and arrangement in an undepicted lattice pattern or circular pattern is also fine. In addition, the arrangement order of the color bars of the various colors is not particularly limited, so it is possible to appropriately design this so that the desired effect is easily attained in accordance with the application or the like of the color chart.

The color bars of the various colors can be formed using commonly known conventional methods, such as a vapor deposition method, a dyeing method, a printing method, a transfer method, an ink jet method or the like. The method of forming the color bars through a dyeing method was discussed above, so the description is omitted here. In addition, the color bar group can be formed by arranging the color bars of the various colors formed through the above-described methods in the desired pattern on one surface of the below-described transparent substrate and interposing this between the aforementioned transparent substrate and a cover glass.

2. Light Shielding Part

The color chart typically has a light shielding part provided at the outer periphery of the above-described color bar group, on the above-described transparent substrate. As the light shielding part, a part having the desired light shielding property may be used, and for example a printing layer or the like formed with black ink or a metal film such as chrome film or the like can be cited. For the method of forming the light shielding part, it is possible to use a commonly known conventional method in accordance with the material used.

3. Transparent Substrate

The transparent substrate in the present disclosure is not particularly limited as long as it is one that has the desired light transmittance and can support the light shielding part and the color bar group, and it is possible to use the same transparent substrate as is used in a commonly known conventional color chart. Specifically, it is possible to use an inorganic substrate such as a glass substrate or the like or a resin substrate. The resin substrate may be board-shaped, or may be a film or sheet.

4. Other

The color chart, in addition to the above-described composition, may also have an alignment mark, an identification code, a cover glass, a color bar holding frame, a transparent substrate with attached light shielding part, or the like. The identification code can, for example, be a code in which information about the test chart or the like is recorded. In addition, the alignment mark can be a mark on which position information is recorded, but may also function as an identification code in which information about the test chart or the like is recorded. This may be provided on the transparent protective plate having an attached light shielding part.

In addition, the color chart may have an IR cut filter. When the color bars of the various colors are formed through a dyeing method, due to the dyeing properties there is a tendency for the light to readily pass in the wavelength region in which the transmission spectrum is at least 650 nm, and this has high light transmittance. In particular, dyes used in Ye, 0 and R color bars tend to have difficulty absorbing light on the longer wavelength side from near 650 nm. Consequently, in the long wavelength region, the transmission spectra of the various colors overlap. In contrast, by including an IR cut filter that removes the desired region in the color bar, it is possible to separate the transmission spectra of the various colors, and it is possible to prevent mixing of the colors. The IR cut filter can be selected by taking into consideration the wavelength region to be blocked, in conjunction with the transmission spectrum properties of the color bars of the various colors. A conventional commonly known IR cut filter can be used.

The size of the color chart can be designed in accordance with the imaging device to which this is applied. In addition, for example, when the color chart is used in color evaluation and color correction of output images of measured samples imaged at equal magnification by an imaging device, it is possible to make this a color chart for macro-imaging in which is formed a color bar group of a size in accordance with the photographed image size.

The present invention is not limited to the above-described embodiments. The above-describe embodiments are examples, and everything having a composition that is substantially the same as the technical concept disclosed in the Scope of Claims of this invention and having the same efficacy are included within the technical scope of this invention.

EXAMPLES

Below, examples are shown and the present disclosure is described in greater detail.

Reference Examples 1 to 6

The spectrum properties of the color calibration viewer close to CIE standard light source D65 was studied through simulation. The results are shown in FIG. 10 and Table 1.

TABLE 1

| Wavelength | Relative intensity (Optical intensity) | | | | | |
|---|---|---|---|---|---|---|
| | Reference Example 1 | Reference Example 2 | Reference Example 3 | Reference Example 4 | Reference Example 5 | Reference Example 6 |
| Peak top in the second wavelength region (413 nm) | 0.8899 | 0.8899 | 0.8899 | 0.8899 | 0.95 | 0.638 |
| Peak top in the first wavelength region (454 nm) | 1 | 1 | 1 | 1 | 1 | 1 |
| 505 nm | 0.9265 | 0.8575 | 0.9053 | 0.9053 | 0.9265 | 0.8575 |
| 560 nm | 0.8072 | 0.7549 | 0.8242 | 0.7785 | 0.8072 | 0.7549 |
| 620 nm | 0.7178 | 0.7178 | 0.7731 | 0.677 | 0.7178 | 0.7178 |

Example

Figure 20:
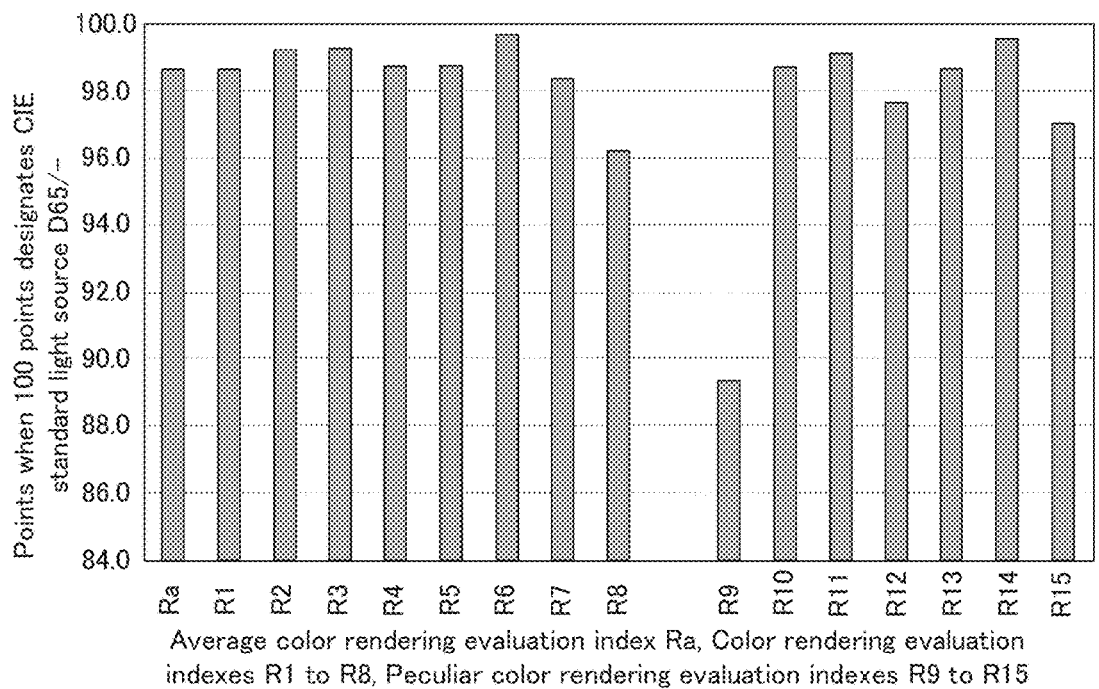
FIG. 20 is a graph showing an average color rendering evaluation index Ra, color rendering evaluation indexes R1 to R8, and peculiar color rendering evaluation indexes R9 to R15.

A color calibration viewer was made using a combination of a violet excitation LED with an acrylic resin board (thickness: 2 mm) having 88% or more of acrylic resin as the light diffusing layer. The color difference ΔE*ab in CIELAB space and the optical intensity of the obtained color calibration viewer were measured. The results are shown in FIG. 7, FIG. 8, and Table 2. In addition, the color difference of the three kinds of light source was compared to CIE standard light source D65 using the average color rendering evaluation index Ra, color rendering evaluation indexes R1 to R8, and peculiar color rendering evaluation indexes R9 to R15. The results are shown in FIG. 20.

Incidentally, for the measurement of the optical intensity, SR-3 from TOPCON CORPORATION was used and the values measured under the above described measurement conditions were used.

TABLE 2

| Wavelength | Relative intensity (Optical intensity) Example |
|---|---|
| Peak top in the second wavelength region (413 nm) | 0.8899 |
| Peak top in the first wavelength region (454 nm) | 1 |

TABLE 2-continued

| Wavelength | Relative intensity (Optical intensity) Example |
|---|---|
| 505 nm | 0.9265 |
| 560 nm | 0.8072 |
| 620 nm | 0.7178 |

From the results of Example shown in FIG. 7, FIG. 8, and Table 2, it has been clarified that the color calibration viewer of the present disclosure was the light source close to the CIE standard light source D65. Incidentally, the detailed explanation thereof may be in the same contents as the descriptions of FIG. 7 and FIG. 8 explained above; thus the descriptions herein are omitted. In addition, it has been shown that the color calibration viewer of the present disclosure was the light source close to the CIE standard light source D65 also in the average color rendering evaluation index Ra, color rendering evaluation indexes R1 to R8, and peculiar color rendering evaluation indexes R9 to R15 as shown in FIG. 20.

REFERENCE SIGNS LIST

1 . . . light source
2 . . . housing body
3 . . . upper lid
4 . . . transmittance adjusting layer
5 . . . light diffusing layer
6 . . . luminance distribution adjusting board
7 . . . heat sink
8 . . . light controlling circuit
9 . . . convertor
10 . . . power switch
11 . . . power cable
12 . . . transparent substrate
13 . . . color bar group
14 . . . light shielding part
15 . . . color bar holding frame
16 . . . color bar
20 . . . transmission type color chart for color calibration (color chart)
100 . . . color calibration viewer

The invention claimed is:
1. A color calibration viewer for color calibrating an imaging device with a broad color gamut, the color calibration viewer comprising:

a LED consisting of a violet excitation LED configured by combination of a violet LED chip with a plurality of fluorescent bodies, the violet excitation LED emitting light from a surface, a peak wavelength of a transmission spectrum thereof being 390 nm or more and 415 nm or less, an irradiating light thereof having spectrum properties as follows:

a peak top in a first wavelength region within a range of wavelength of 440 nm or more and 470 nm or less;

a relative intensity at a wavelength of 505 nm that is 0.80 or more and 0.95 or less, and a relative intensity at a wavelength of 620 nm that is 0.65 or more and 0.80 or less, where 1 designates an optical intensity of the peak top in the first wavelength region; and a ratio (A/B) of A and B is 1.00 or more and 1.46 or less, where A designates an optical intensity at a wavelength of 505 nm, and B designates an optical intensity at a wavelength of 620 nm; and a transmittance adjusting layer disposed at the surface.

2. The color calibration viewer according to claim 1, wherein the irradiating light further has spectrum properties as follows:

a peak top in a second wavelength region within a range of wavelength of 390 nm or more and 430 nm or less; and a relative intensity of the peak top in the second wavelength region is 0.60 or more and 1.00 or less, where 1 designates the optical intensity at the peak top in the first wavelength region.

3. A color calibration set comprising:

the color calibration viewer according to claim 1; and a color chart for color calibration including a transparent substrate and a color bar group formed on the transparent substrate, wherein the color bar group is constituted by color bars of at least six colors of red, green, blue, a first color, a second color, and white arranged in a pattern in no particular order, coordinate points of the first color are within a region encompassed by four points (0.351, 0.649), (0.547, 0.453), (0.380, 0.506) and (0.433, 0.464) on an xy chromaticity diagram, coordinate points of the second color are within a region encompassed by four points (0.125, 0.489), (0.112, 0.229), (0.270, 0.407) and (0.224, 0.242) on an xy chromaticity diagram, a peak wavelength of the transmission spectrum of the red color bar is 600 nm or more and 680 nm or less, a peak wavelength of the transmission spectrum of the green color bar is 495 nm or more and 570 nm or less, a peak wavelength of the transmission spectrum of the blue color bar is 430 nm or more and 490 nm or less, a peak wavelength of the transmission spectrum of the first color bar is 540 nm or more and 595 nm or less, and a peak wavelength of the transmission spectrum of the second color bar is 470 nm or more and 515 nm or less.

4. The color calibration viewer according to claim 1, wherein the transmittance adjusting layer has a light diffusing function.

* * * * *